United States Patent
Adams et al.

(10) Patent No.: US 9,807,082 B2
(45) Date of Patent: Oct. 31, 2017

(54) CERTIFICATE INFORMATION STORAGE SYSTEM AND METHOD

(75) Inventors: Neil P. Adams, Waterloo (CA);
Herbert A. Little, Waterloo (CA);
Michael G. Kirkup, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 939 days.

(21) Appl. No.: 13/043,859

(22) Filed: Mar. 9, 2011

(65) Prior Publication Data

US 2011/0271115 A1 Nov. 3, 2011

Related U.S. Application Data

(63) Continuation of application No. 10/508,115, filed as application No. PCT/CA03/00406 on Mar. 20, 2003, now abandoned.

(60) Provisional application No. 60/365,516, filed on Mar. 20, 2002.

(51) Int. Cl.
G06F 21/00 (2013.01)
H04L 29/06 (2006.01)
G06F 21/60 (2013.01)

(52) U.S. Cl.
CPC ........ H04L 63/0823 (2013.01); G06F 21/606 (2013.01)

(58) Field of Classification Search
CPC .................................................. G06Q 20/401
USPC .......................................................... 705/51
See application file for complete search history.

(56) References Cited

U.S. PATENT DOCUMENTS

| | | | |
|---|---|---|---|
| 5,958,005 A * | 9/1999 | Thorne et al. | 709/202 |
| 6,457,044 B1 | 9/2002 | IwaZaki | |
| 6,990,578 B1 * | 1/2006 | O'Brien | H04L 63/0428 705/51 |
| 7,069,310 B1 * | 6/2006 | Bartholomew | 709/219 |
| 7,412,599 B1 | 8/2008 | Nathoo et al. | |
| 7,496,604 B2 * | 2/2009 | Sutton, Jr. | H04L 9/3247 |
| 2001/0054149 A1 | 12/2001 | Kawaguchi et al. | |
| 2002/0052921 A1 | 5/2002 | Morkel | |
| 2002/0138582 A1 | 9/2002 | Chandra et al. | |

(Continued)

FOREIGN PATENT DOCUMENTS

| | | |
|---|---|---|
| EP | 1139608 A2 | 10/2001 |
| JP | 2001352338 | 12/2001 |
| WO | 02101580 A1 | 12/2002 |

OTHER PUBLICATIONS

Notice of Reasons for Rejection, dated Jul. 14, 2008, by Japanese Patent Office for Japanese Patent Application No. 2003-577495 in Japanese language, and English translation thereof.

(Continued)

*Primary Examiner* — Charles C Agwumezie
(74) *Attorney, Agent, or Firm* — Thomas Grzesik; Fleit Gibbons Gutman Bongini & Bianco P.L.

(57) ABSTRACT

A system and method of storing in a computer device digital certificate data from a digital certificate are provided. When a digital certificate is received at the computer device, it is determined whether the digital certificate data in the digital certificate is stored in a first memory store in the computer device. The digital certificate data is stored in the first memory store upon determining that the digital certificate data is not stored in the first memory store.

27 Claims, 11 Drawing Sheets

(56) References Cited

U.S. PATENT DOCUMENTS

| | | | |
|---|---|---|---|
| 2003/0041110 A1 | 2/2003 | Wenocur et al. | |
| 2003/0105716 A1 | 6/2003 | Sutton et al. | |
| 2003/0158864 A1* | 8/2003 | Samn | 707/200 |
| 2003/0199282 A1* | 10/2003 | Marcjan | H04W 4/14 455/466 |
| 2005/0203855 A1* | 9/2005 | Malcolm | G06F 21/606 705/64 |
| 2006/0095527 A1 | 5/2006 | Malik | |
| 2006/0116982 A1 | 6/2006 | Samn | |
| 2009/0187549 A1 | 7/2009 | Samn | |

OTHER PUBLICATIONS

Notice of Final Rejection issued by the Japanese Patent Office and dated Jun. 22, 2009 for Japanese Patent Application No. 2003-577495, in the Japanese language, and English translation thereof.

Microsoft Corporation, "Microsoft Exchange 2000 Server Resource Kit 1/2 Introductory Guide", 1st ed. Nikkei BP Soft Press Inc., Okamura Kohei, Apr. 23, 2001, 1st impression, pp. 558-562. (in Japanese).

Glenn, Walter J., Microsoft Exchange 2000 Server Administrator's Companion 2/2 1st ed., Nikkei BP Soft Press Inc., Okamura Kohei, Apr. 2, 2001, 1st impression, pp. 201-205. (in Japanese).

International Search Report of Application No. PCT/CA03/00406, dated Jul. 21, 2003—7 pgs.

Microsoft Corporation, "Microsoft Exchange 2000 Server Resource Kit 1/2 Introductory Guide", 1st ed. Nikkei BP Soft Microsoft Press Inc., Okamura Kohei, Apr. 23, 2001, pp. 594-600.

\* cited by examiner

US 9,807,082 B2

CERTIFICATE INFORMATION STORAGE SYSTEM AND METHOD

The present application is a continuation of U.S. patent application Ser. No. 10/508,115 filed on Sep. 17, 2004, which is a National Phase Application of PCT Application No. PCT/CA2003/000406 filed Mar. 20, 2003, which claims benefit of U.S. Provisional Patent Application Ser. No. 60/365,516, filed on Mar. 20, 2002, all of which are incorporated herein by reference.

BACKGROUND

Technical Field

This application relates generally to the field of secure electronic messaging and in particular to storing cryptographic information contained in an electronic message in a memory of a computer device.

Description of the State of the Art

Known secure messaging clients, such as e-mail software applications operating on a computer device, maintain separate data stores or data storage areas for storing secure messaging information separate from other information. Such secure messaging information may include digital certificates, public keys, and the like. The other information may include contact information such as an address book, schedule information such as calendar reminders and appointments, and the like. A digital certificate may include information relevant to other types of stored information. For example, a digital certificate normally includes the public key of an entity as well as identity information that is bound to the public key with one or more digital signatures. When a digital certificate is loaded onto a system for use by a messaging client, if the entity's contact information is not already stored in an address store accessible to the messaging client, then a user must either manually add contact information for the entity identified in the digital certificate into an address book or similar contact list stored on the messaging client or manually enter an address for the entity each time a message is to be sent to that entity.

SUMMARY

A method of storing digital certificate information from a digital certificate received at a messaging client according to an aspect of the invention comprises the steps of extracting the digital certificate information from the digital certificate, determining whether the extracted digital certificate information is stored in a data store at the messaging client, and storing the extracted digital certificate information in the data store where the extracted digital certificate information is not stored in the data store.

A system for storing digital certificate information at a messaging client in accordance with another aspect of the invention comprises a digital certificate loader module configured to receive digital certificates, and a digital certificate information injector module configured to extract digital certificate information from a digital certificate after the digital certificate is received by the digital certificate loader module, to determine whether the extracted digital certificate information is stored in an entry in a first data store, and to store the extracted digital certificate information in the first data store where the extracted digital certificate information is not stored in the entry in the first data store.

According to a further aspect of the invention, a method of managing digital certificate data stored in a mobile communication device comprises the steps of receiving transmitted digital certificate data at the mobile communication device, comparing the transmitted digital certificate data to digital certificate data stored in a memory store in the mobile communication device, and updating the memory store to include transmitted digital certificate data not stored in the memory store.

DETAILED DESCRIPTION

Secure messages include messages that have been signed with digital signature, encrypted, or otherwise processed to ensure one or more of data confidentiality, data integrity and user authentication. For example, a secure message may be a message that has been signed, encrypted, encrypted and then signed, or signed and then encrypted, by a message sender. These operations may be carried out according to a known standard, such as the Secure Multipurpose Internet Mail Extensions (S/MIME) standard.

Figure 1:
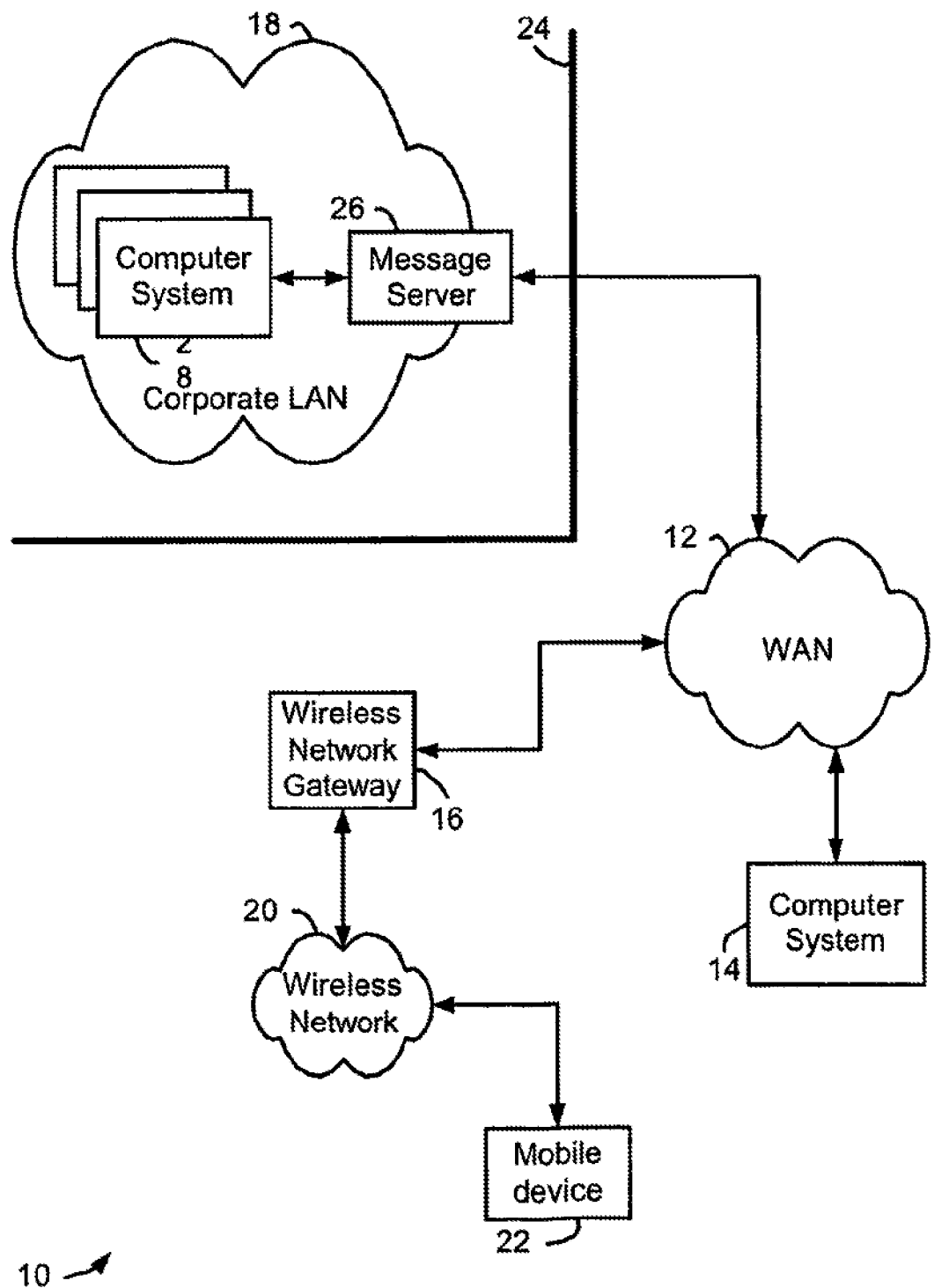
FIG. 1 is a block diagram of a messaging system.

FIG. 1 is a block diagram of a messaging system. There are many different messaging system topologies, and the system shown in FIG. 1 is but one of many that may be used with the systems and methods disclosed herein.

The system 10 includes a Wide Area Network (WAN) 12, to which a computer system 14, a wireless network gateway 16, and a corporate Local Area Network (LAN) 18 are connected. The wireless network gateway 16 is also connected to a wireless communication network 20 in which a wireless mobile communication device 22, hereinafter referred to primarily as a mobile device, is configured to operate.

The computer system 14 represents a desktop or laptop PC that is configured for connection to the WAN 12. The WAN 12 can be a private network, or a larger publicly accessible network, such as the Internet. PCs such as the computer system 14 normally access the Internet through an Internet Service Provider (ISP), Application Service Provider (ASP) or the like.

The corporate LAN 18 is an example of a network-based messaging client. As shown, a corporate LAN 18 is normally located behind a security firewall 24. Within the corporate LAN 30 is a message server 26, running on a computer within the firewall 24, that functions as the main interface for the corporation to exchange messages both within the LAN 18 and with other external messaging clients via the WAN 20. Two of the most common message servers 26 are the Microsoft™ Exchange and Lotus Domino™ server products. These servers are often used in conjunction with Internet mail routers that route and deliver mail. A message server 26 may extend beyond just message sending and receiving, providing such functionality as dynamic database storage engines that have predefined database formats for data like calendars, to-do lists, task lists, e-mail and documentation.

The message server 26 provides messaging capabilities to one or more network computer systems 28 in the LAN 18. A typical LAN includes multiple computer systems shown generally as computer systems 28, each of which implements a messaging client, most often as a software application such as Microsoft Outlook™, for messaging functions. In the network 18, messages are received by the message server 26, distributed to the appropriate mailboxes for user accounts addressed in the received message, and can be accessed by a user through a computer in the one or more computer systems 28. Although messaging clients in the LAN 18 operate on the computer systems 28, there are also known messaging clients that operate in conjunction with handheld devices and other systems or devices with electronic messaging capabilities. Like the message server 26, a messaging client may also have additional non-messaging functions.

The wireless network gateway 16 provides an interface to a wireless network 20, through which messages may be exchanged with a mobile device 22. Such functions as addressing of a mobile device 22, encoding or otherwise transforming messages for wireless transmission, and any other required interface functions are performed by the wireless network gateway 16. Where the wireless network gateway 16 is configured for operation in conjunction with more than one wireless network 20, the wireless network gateway 16 may also determine a most likely network for locating a given user and track users as they roam between countries or networks.

Any computer system with access to the WAN 12 may exchange messages with a mobile device 22 through the wireless network gateway 16. Alternatively, private wireless network gateways such as wireless Virtual Private Network (VPN) routers could also be implemented to provide a private interface to a wireless network such as 20. For example, a wireless VPN implemented in the LAN 18 provides a private interface from the LAN 18 to one or more mobile devices through the wireless network 20.

Such a private interface to wireless devices via the wireless network gateway 16 and/or the wireless network 20 can effectively be extended to entities outside the LAN 18 by providing a message forwarding or redirection system which operates with the message server 26. In this type of system, incoming messages received by the message server 26 and addressed to a user that has a mobile device 22 are redirected through the wireless network interface, either a wireless VPN router, the gateway 16 or another interface, for example, to the wireless network 20 and to the user's mobile device 22. An exemplary redirector system operating on the message server 26 may be of the type disclosed in U.S. Pat. No. 6,219,694, entitled "SYSTEM AND METHOD FOR PUSHING INFORMATION FROM A HOST SYSTEM TO A MOBILE DATA COMMUNICATION DEVICE HAVING A SHARED ELECTRONIC ADDRESS," the entire disclosure of which is incorporated herein by reference.

In wireless networks such as 20, messages are normally delivered to and from mobile devices such as the mobile device 22 via RF transmissions between base stations in the wireless network 20 and mobile devices. Modern wireless networks typically serve thousands of subscribers, each subscriber having a mobile device. The wireless network 20 may be one of many different types of wireless network, such as a data-centric wireless network, a voice-centric wireless network or and a dual-mode networks that can support both voice and data communications over the same physical base stations. Dual-mode networks include, but are not limited to recently-developed Code Division Multiple Access (CDMA) networks, the Groupe Special Mobile or the Global System for Mobile Communications (GSM) and the General Packet Radio Service (GPRS), and future third-generation (3G) networks like Enhanced Data rates for Global Evolution (EDGE) and Universal Mobile Telecommunications Systems (UMTS). GPRS is a data overlay on the GSM wireless network, operating in virtually every country in Europe. In addition to these illustrative wireless networks, other wireless networks may also be used.

Other examples of data-centric networks include, but are not limited to the Mobitex™ Radio Network ("Mobitex") and the DataTAC™ Radio Network ("DataTAC"). Examples of older voice-centric data networks include Personal Communication Systems (PCS) networks like CDMA, GSM, and Time Division Multiple Access (TDMA).

The mobile device 22 may be a data communication device, a voice communication device, or a multiple-mode device capable of voice, data and other types of communications. An exemplary mobile device 22 is described in further detail below and with reference to FIG. 8.

Perhaps the most common type of messaging currently in use is e-mail. In a standard e-mail system, an e-mail message is sent by an e-mail sender, possibly through a message server and/or a service provider system, and typically routed through the Internet to one or more message receivers. E-mail messages are normally sent unencrypted and use traditional Simple Mail Transfer Protocol (SMTP), RFC822 headers and MIME body parts to define the format of the e-mail message. As described briefly above, a message that is routed to an addressed message receiver can be redirected to a mobile device. Since a wireless link cannot be physically secured in the same way as a wired connection, messages are often encrypted for transfer through a wireless network. Overall message security can be further enhanced if a secure transfer mechanism is also used between the message sender and each recipient.

In recent years, secure messaging techniques have evolved to protect both the content and integrity of messages such as e-mail messages. S/MIME and Pretty Good Privacy™ (PGP™) are two public secure e-mail messaging protocols that provide for encryption to protect data content, and signing to protect the integrity of a message and provide for sender authentication by a message receiver.

Figure 2:
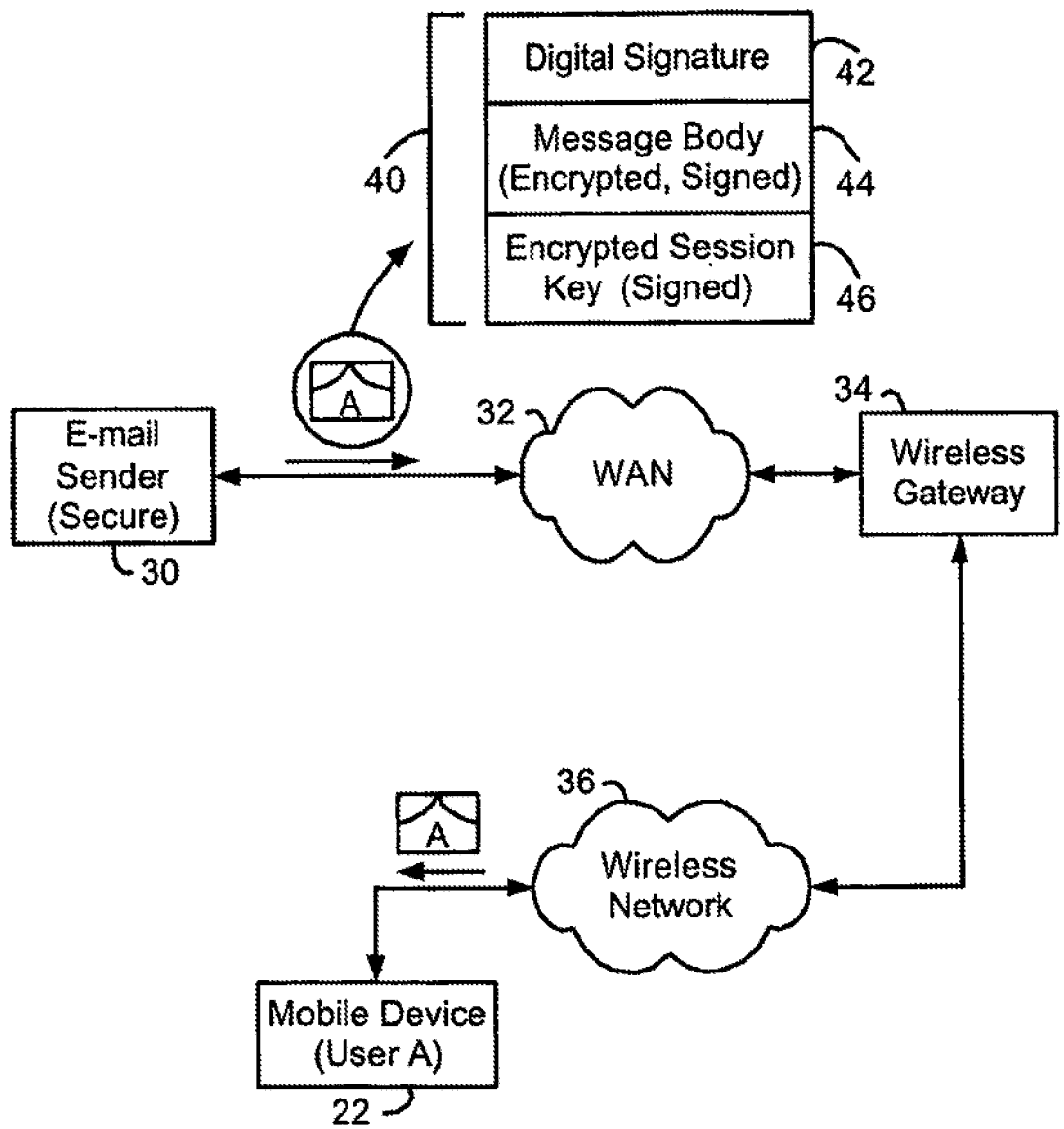
FIG. 2 is a block diagram illustrating a messaging system and a secure e-mail message exchange.

FIG. 2 is a block diagram illustrating a messaging system and a secure message exchange. The messaging system in FIG. 2 illustrates components involved in an example e-mail message exchange between two messaging clients, operating at an e-mail sender 30 and a mobile device 22. Many other components may be present in the overall messaging system and involved in routing the message from the sender 30 to the receiver, mobile device 22, but have not been shown in FIG. 2 to avoid congestion in the drawing. FIG. 2 also shows an encrypted and signed message as one example of a secure message. The systems and methods disclosed herein are also applicable to messaging clients that can send and receive other types of secure messages as well. Messaging clients may be configured to send either secure or unsecure messages, for example, in response to default configuration settings or a per-message selection by a user at a sender system.

The system in FIG. 2 includes an e-mail sender 30, configured for access to a WAN 32. The wireless gateway 34 provides an interface to the wireless network 36 in which the mobile device 22 is adapted to operate.

The e-mail sender 30 may, for example, be a PC such as the system 14 in FIG. 1, or a network-connected computer such as 28. The e-mail sender 30 might also be a mobile device on which e-mail messages may be composed and sent. The WAN 32, wireless gateway 34, wireless network 36 and mobile device 22 are substantially the same as similarly labelled components in FIG. 1.

According to secure messaging schemes such as S/MIME and PGP, a message 40 is encrypted using a one-time session key chosen by the e-mail sender 30. The session key is used to encrypt the message body and is then itself encrypted using the public key of each addressed message receiver to which the message is to be sent. Encrypted in this way, message 40 includes an encrypted message body 44 and an encrypted session key 46. In this type of message encryption scheme, a message sender, such as e-mail sender 30, must have access to the public key of each entity to which an encrypted message is, to be sent.

A secure e-mail message sender such as 30 normally signs a message by taking a digest of the message and signing the digest using the sender's private key. A digest may, for example, be generated by performing a check-sum, a Cyclic, Redundancy Check (CRC), a digest algorithm such as Message Digest Algorithm 5 (MD5), a hash algorithm such as Secure Hashing Algorithm 1 (SEA-1), or some other preferably non-reversible operation on the message. In the example shown in FIG. 2, both the encrypted message body 44 and the encrypted session key 46 are used to generate a digest. This digest is then signed by the sender 30 using the sender's private key. The signature private key is used, for example, to perform an encryption or other transformation operation on the digest to generate the digest signature. A digital signature, including the digest and the digest signature, is then appended to the outgoing message, as shown at 42. A digital certificate of the sender, which includes the sender's public key and sender identity information that is bound to the public key with one or more digital signatures, and possibly any chained digital certificates and Certificate Revocation Lists (CRLs) associated with the sender's digital certificate and any chained digital certificates may also be attached to the secure message 40.

In S/MIME, digital signatures, as well as any digital certificates and CRLs, if included, are normally placed at the beginning of a message as shown in FIG. 2. Messages according to other secure messaging schemes may place message components in a different order than shown or include additional and/or different components. For example, a secure message 40 includes at least addressing and possibly other header information that may possibly be signed but most of which is typically not encrypted.

When the secure e-mail message is sent from the e-mail sender 30, it is routed through the WAN 32 to the wireless gateway 34. As described above, the e-mail sender 30 may send the message 40 directly to a wireless gateway 34 or the message 40 may instead be delivered to a computer system associated with the mobile device 22 and then redirected to the mobile device 22 through the wireless gateway 34. Alternatively, the message may be routed or redirected to the mobile device 22 through the wireless network 36 through a wireless VPN router.

The receiver of such a signed message, mobile device 22 in the example shown in FIG. 2, may verify the digital signature 42. In order to verify the digital signature 42, the mobile device uses a digital signature check algorithm corresponding to the signature generation algorithm used by the message sender, which may be specified in a message header or in the digital signature 42, and the sender's public key. If a secure message includes the sender's digital certificate, then the sender's public key may be extracted from the digital certificate. The sender's public key may instead be retrieved from a local store, for example, where the public key was extracted from an earlier message from the sender and stored in a key store in the receiver's local store or the sender's digital certificate is stored in the local store, or from a Public Key Server (PKS). A PKS is a server that is normally associated with a Certificate Authority (CA) from which a digital certificate for an entity, including the entity's public key, is available. A PKS might reside within a corporate LAN such as LAN 18 of FIG. 1, or anywhere on the WAN 32, Internet or other network or system through which message receivers may establish communications with the PKS.

Although digital signature algorithms and digest algorithms may be publicly known, a sender signs an original message using its own private key. Therefore, an entity that alters an original message cannot generate a digital signature that can be verified with the sender's public key. If a sent message is altered by an attacker after it has been signed by a gender, then the digital signature verification based on the sender's public key fails. These mathematical operations do not prevent anyone from seeing the contents of the secure message, but do ensure that the message has not been tampered with because it was signed by the sender, and that the message was signed by the person as indicated in the "From" field of the message.

When the digital signature 42 has been verified, or even if digital signature verification fails, the encrypted message body 44 is then decrypted before it can be displayed or further processed. A message receiver uses its private key to decrypt the encrypted session key 46 and then uses the decrypted session key to decrypt the encrypted message body 44 and thereby recover the original message. Decryption typically requires action on the part of a user, such as entry of a password or passphrase. Normally, an encrypted message will be stored at a receiving messaging client only in its encrypted form. Each time the message is to be displayed or otherwise processed, it is first decrypted. Those skilled in the art will appreciate that an entity may have more than one associated cryptographic key pair, such as a signature private/public key pair and an encryption private/public key pair. Thus, the mobile device 22 may use one private key to decrypt the encrypted message body 44, and a different private key to digitally sign an outgoing secure message.

An encrypted message that is addressed to more than one receiver includes an encrypted version of the session key, for each receiver, that was encrypted using the public key of the receiver. Each receiver performs the same digital signature verification operations, but decrypts a different one of the encrypted session keys using its own private key.

Therefore, in a secure messaging system, a sending messaging client must have access to the public key of any receiver to which an encrypted message is to be sent. A receiving messaging client must be able to retrieve the sender's public key, which may be available to a messaging client through various mechanisms, in order to verify a digital signature in a signed message.

Public keys are commonly provided in digital certificates. As described above, a digital certificate for any particular entity typically includes the entity's public key and identification information that is bound to the public key with a digital signature. Several types of digital certificates are currently in widespread use, including for example X.509 digital certificates that are typically used in S/MIME. PGP uses digital certificates with a slightly different format. Other digital certificates, such as a digital certificate according to a proprietary standard, may also be used.

The digital signature in a digital certificate is generated by the issuer of the digital certificate, and can be checked by a message receiver substantially as described above. A digital certificate may include an expiry time or validity period from which a messaging client determines if the digital certificate has expired. Verification of the validity of a digital certificate may also involve tracing a certification path through a digital certificate chain, which includes a user's digital certificate and other digital certificates to verify that the user's digital certificate is authentic. A digital certificate may also be checked against a CRL to ensure that the digital certificate has not been revoked.

If the digital signature in a digital certificate for a particular entity is valid, the digital certificate has not expired or been revoked, and the issuer of either the digital certificate or a chained digital certificate is trusted, then the public key in the digital certificate is assumed to be the public key of the entity for which the digital certificate was issued, also referred to as the subject of the digital certificate.

Digital certificates may be available to a messaging client from several sources. When a digital certificate is attached to a received message, the digital certificate can be extracted from the message and stored in a memory store in the messaging client. Otherwise, digital certificates can be requested and downloaded from a PKS on a LAN, the Internet, or other network with which a requestor may establish communications. It is also contemplated that a messaging client may load digital certificates from other sources than a PKS. For example, many modern mobile devices are configured for connection to a PC. By connecting a mobile device to a PC to download digital certificates via a physical connection, such as a serial port or USB port, over-the-air transfer of digital certificates may be reduced. If such a physical connection is used to load digital certificates for entities to which a user expects to send encrypted messages, then these digital certificates need not be downloaded when encrypted messages are to be sent to any of these entities. A user may similarly load digital certificates for any entities from which signed messages are expected to be received, such that digital signatures may be verified even if one of these entities does not append its digital certificate to a signed message.

When a digital certificate has been stored and is accessible by a messaging client, known messaging clients require manual contact information entry for the subject entity of each digital certificate unless this information has already been stored for the subject entity. When multiple digital certificates are downloaded to a mobile device, manual entry of contact information associated with each digital certificate can become particularly cumbersome. Other information in a digital certificate, such as a digital certificate expiry time or validity period, may also be important for messaging client operations and manual entry thereof can be similarly inconvenient.

In one embodiment, digital certificate information is extracted from each digital certificate as it is loaded onto a mobile device 22 and stored in an address book or similar contact information store, or possibly another data store, on the mobile device 22.

Figure 3:
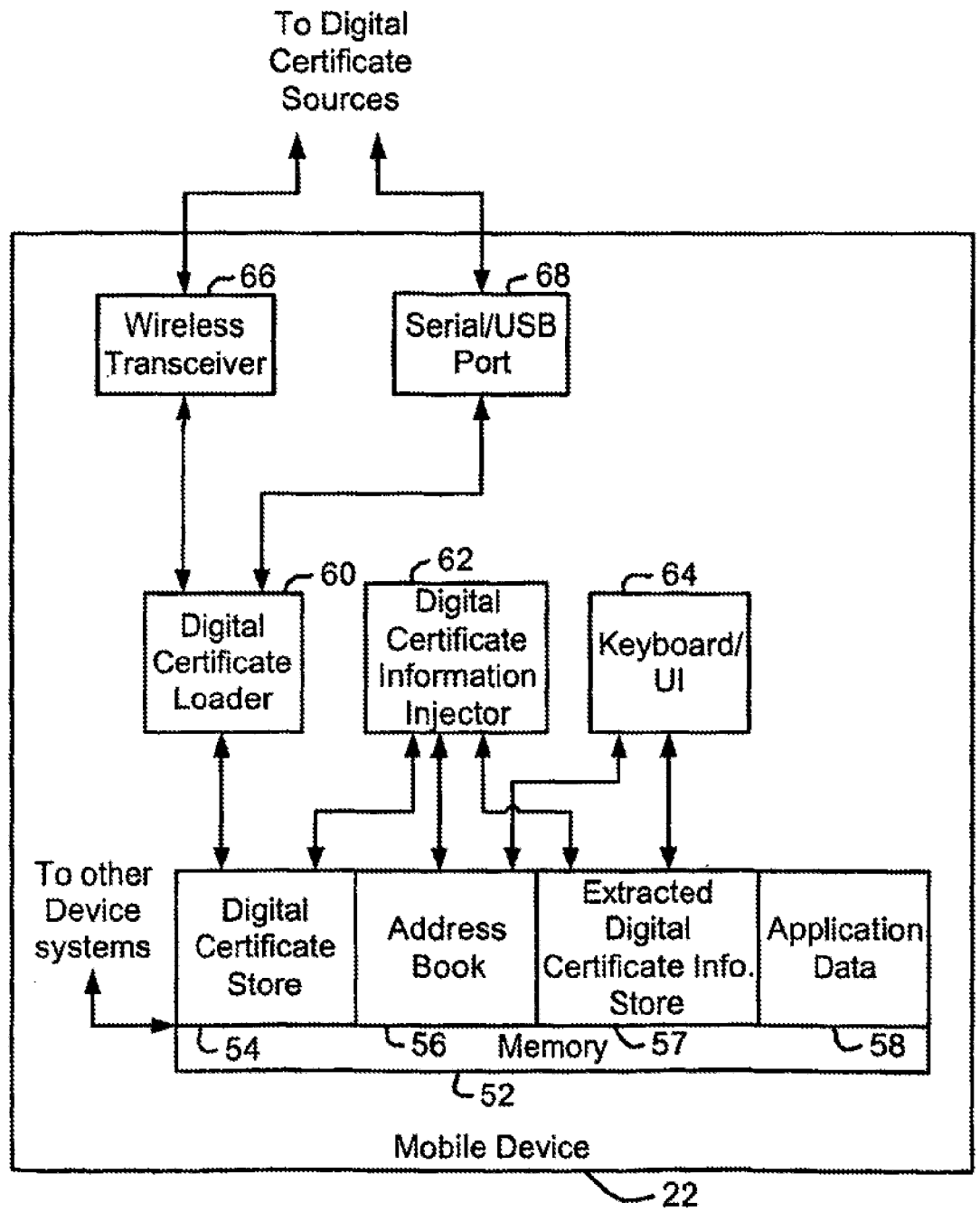
FIG. 3 is a block diagram of a mobile device with a digital certificate information storage system.

FIG. 3 is a block diagram of a mobile device 22 with a digital certificate information storage system. An exemplary mobile device 22 is described in greater detail with reference to FIG. 8.

As shown in FIG. 3, a mobile device 22 incorporating a digital certificate information storage system comprises a memory 52, a digital certificate loader 60, a contact information injector 62, a keyboard and user interface (UI) 64, a wireless transceiver 66, and a serial or universal serial bus (USB) port 68. The memory 52 preferably includes a plurality of different storage areas or data stores, shown in FIG. 3 as a digital certificate store 54, an address book 56 in which contact information is stored, an extracted digital certificate information store 57 in which other digital certificate information is stored, and an application data storage area 58. Other data may also be stored in the memory 52.

The memory 52 is a writeable store such as a RAM or flash memory into which other device components may write data. The digital certificate store 54 is a storage area dedicated to storage of digital certificates on the device 22. Digital certificates may be stored in the digital certificate store 54 in the format in which they are received, or may alternatively be parsed or otherwise translated into a storage format before being written to the store 54. The address book 56 is a contact information store that stores contact information for entities with which a user of the mobile device 22 may exchange messages. The address book may also store physical address, mailing address and other contact information in addition to or instead of information that is used for messaging using the mobile device 22. The extracted digital certificate information store 57 is configured to store other information from digital certificates stored in the digital certificate store to enable simpler or faster processing of particular digital certificate information or use of digital certificate information by other systems or software applications installed on the mobile device 22. For example, an expiry time or validity period could be extracted from a digital certificate and used to create an appointment or reminder for a user of the mobile device 22 to thereby provide an indication to the user when a stored digital certificate has expired or is no longer valid. The application data store 58 stores data associated with software applications on the mobile device 22 and represents one illustrative example of other information that may be stored in the memory 52. The memory 52 may also be used by other device systems in addition to those shown in FIG. 3.

The digital certificate loader 60, which will typically be implemented as a software module or application, manages loading of digital certificates onto the mobile device 22. As described above, a mobile device may obtain digital certificates from various sources. The digital certificate loader 60 is therefore connected to communication modules such as the wireless transceiver 66 and the serial or USB port 68, through which digital certificates may possibly be requested and received. For example, when a secure message is received from or is to be sent to an entity for which no digital certificate has been stored in the digital certificate store 54, the mobile device 22 may request the digital certificate from a PKS through the wireless transceiver 66 and also receive the digital certificate from a digital certificate source in response to the request through the wireless transceiver 66. The serial or USB port 68 may also be used in conjunction with a similarly equipped PC to download digital certificates onto the mobile device 22.

The digital certificate information injector 62 preferably monitors the digital certificate store 54 to detect new digital certificates as they are stored to the digital certificate store 54. Alternatively, the digital certificate loader 60 may be configured to notify the digital certificate information injector 62 when a digital certificate is loaded onto the device 22. Upon determining that a new digital certificate has been stored to the digital certificate store 54, the digital certificate information injector 62 extracts information from the digital certificate. When contact information is extracted, the digital certificate information injector 62 stores the extracted contact information to the address book 56, by either creating a new entry in the address book 56 using the extracted contact information or by storing the extracted contact information to an existing entry in the address book 56.

Before a new address book entry is created, the digital certificate information injector 62 preferably checks the address book 56 to determine whether or not the contact information or possibly some portion thereof already exists in an entry in the address book 56. For example, when a subject name is specified in a digital certificate using an e-mail address, the digital certificate information injector 62 may search the address book 56 for the e-mail address and create a new address book entry only if the e-mail address is not found in the address book 56. When an entry exists in the address book 56 for a digital certificate subject, if further contact information is provided in a digital certificate and extracted by the digital certificate information injector 62, the digital certificate information injector 62 preferably checks the existing entry for the subject to determine if the further contact information also exists in the address book entry. If not, then the existing entry is preferably updated by storing the further contact information to the existing entry. Therefore, the digital certificate information injector 62 may update the address book 56 by either adding a new entry using the extracted information or storing extracted information to an existing entry.

The digital certificate information injector 62 may similarly extract other information from digital certificates loaded onto the mobile device 22 for storage in a different store or storage area 57. For example, as described briefly above, digital certificates may include digital certificate expiry or validity information that could be used to create an appointment or reminder for a user of the mobile device 22 to alert the user when a digital certificate expires or is invalid or is about to expire or become invalid. In this example, the digital certificate information injector 62 preferably extracts a digital certificate subject name and expiry or validity information and checks the extracted digital certificate information store 57 to determine if an entry already exists for the subject. If not, then a new entry, i.e., a new reminder or appointment, is created in the store 57 using the extracted digital certificate information. When an entry for the subject does exist in the store 57, then the expiry or validity information in the existing entry may be checked to determine if it is the same as the extracted information. If not, then the digital certificate information injector 62 preferably updates the existing entry with the extracted information. This is useful, for example, when a new digital certificate has been loaded to replace a digital certificate that has not yet expired. Therefore, as above, the digital certificate information injector 62 may update the store 57 by either adding a new entry using the extracted information or storing extracted information to an existing entry.

Other information in a digital certificate could similarly be extracted and stored in memory 52 on the mobile device 22. The types of digital certificate information that are extracted and stored could be configurable by a mobile device user, for example, by establishing settings associated with the digital certificate information injector 62.

In another embodiment, the digital certificate information injector 62 accesses the digital certificate store 54 to extract digital certificate information. The specific scheme of digital certificate information extraction from a stored digital certificate depends upon the format in which digital certificates are stored in the digital certificate store 54. If digital certificates are stored in the digital certificate store 54 in the format in which they are received, then the digital certificate information injector 62 retrieves a digital certificate from the digital certificate store and parses or otherwise translates the digital certificate into an appropriate format so that digital certificate information can be identified and extracted. If received digital certificates are parsed or translated by the digital certificate loader 60 such that parsed data are stored in the digital certificate store 54, then the digital certificate information injector 62 may read only relevant information fields from the parsed data in the digital certificate store 54 as required to populate fields in entries in the other data stores 56, 57. In the latter example, the digital certificate loader 60 may be configured to pass digital certificate information from a digital certificate to the digital certificate information injector 62, which then stores the digital certificate information to the address book 56 or extracted digital certificate information store 57 as described above.

Implementation of a digital certificate information storage system, such as shown in FIG. 3, preferably does not preclude address book or other information entry via input means such as the keyboard/UI 64. When a user wishes to add further contact information to or change information in an existing address book entry or to manually add a new address book entry, for example, the keyboard/UI 64 or possibly another input device provides for manual contact information input and editing, as may occasionally be required.

Although a single memory 52 is shown in FIG. 3, a mobile device 22 may include several different memory units, such that the stores 54, 56, 57, 58 may be implemented in separate memory units. However, the overall operation of a digital certificate information storage system in a multiple memory system is substantially as described above.

The systems and methods disclosed herein are not restricted to implementation in a mobile device 22 having the memory arrangement shown in FIG. 3. For example, further data stores may be provided and configured for storage of information extracted from digital certificates. The extracted digital certificate information store 57 is intended as a general example of a store for digital certificate information other than contact information. Similarly, fewer data stores may be enabled for digital certificate information extraction and storage, such that only one type of digital certificate information, contact information for example, is automatically stored.

While the digital certificate loader 60 and the digital certificate information injector 62 are illustrated as separate blocks in FIG. 3, the digital certificate loader 60 and the digital certificate information injector 62 may be implemented as a single software module, or as separate software modules.

A digital certificate information storage system may also create or update application data in the application data store 58. In the above example of creating or modifying a reminder or appointment based on expiry or validity information extracted from a digital certificate, such a reminder or appointment would typically be used by an agenda or calendar software application on the mobile device 22.

Digital certificate information storage nay also be applicable to other types of systems than a mobile device 22. On a desktop or laptop PC, for example, even though data entry tends to be easier than on the mobile device 22, digital certificate information extraction and storage saves the time and effort associated with manual digital certificate information entry for each digital certificate stored on a system.

Figure 4:
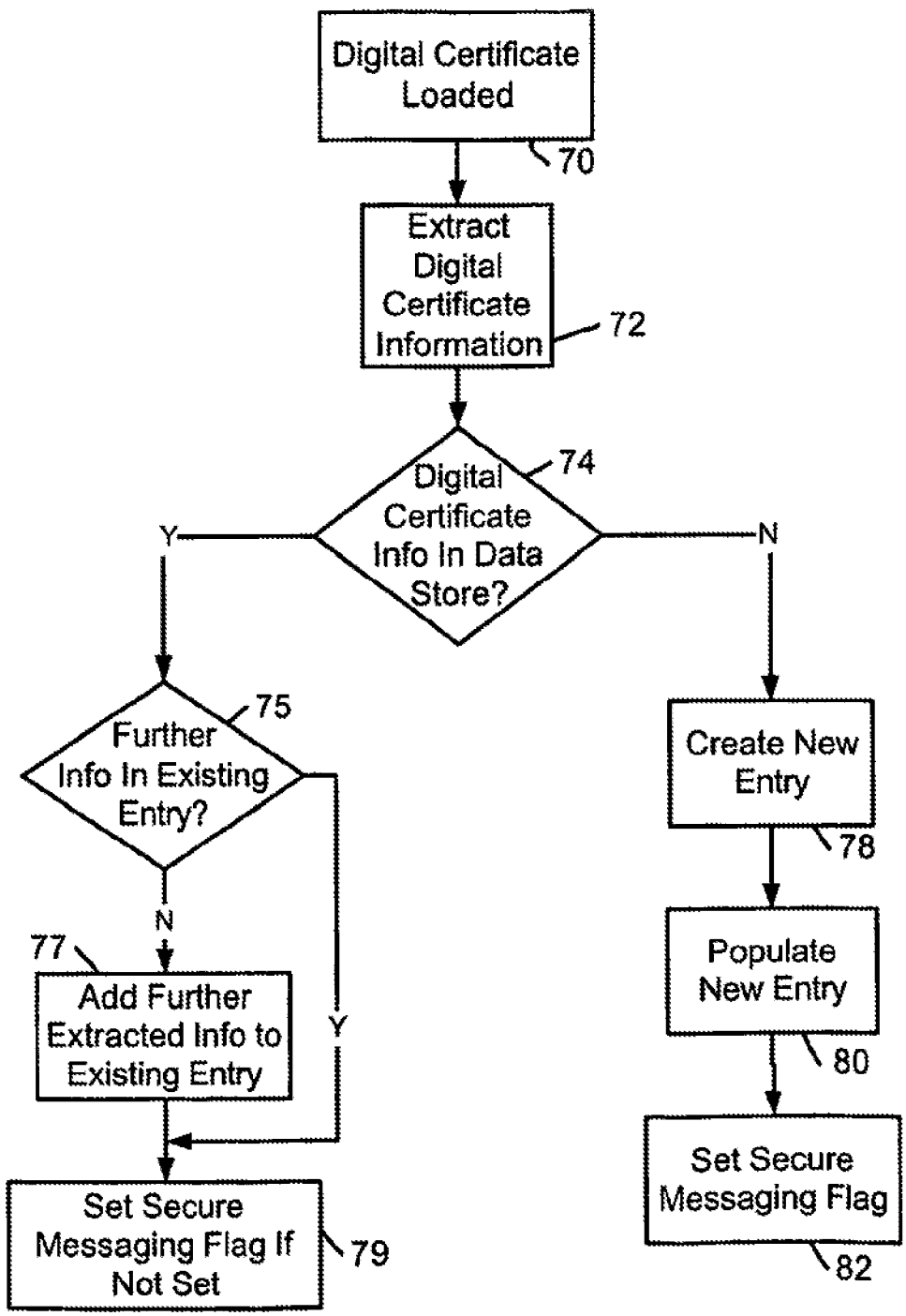
FIG. 4 is a flow diagram illustrating a method of storing digital certificate information.

FIG. 4 is a flow diagram illustrating a method of storing digital certificate information. The method begins at step 70, when a digital certificate is loaded onto a device, such as when storage of a digital certificate to a digital certificate store is detected. At step 72, digital certificate information is extracted from the digital certificate. In order to prevent creation of duplicate entries in a data store, a determination is preferably made at step 74 as to whether or not the digital certificate information or a portion thereof, such as an e-mail address or subject name, already exists in an entry in the data store. If the digital certificate information already exists in the data store, then at step 75, the existing entry is preferably checked to determine whether or not further extracted digital certificate information, if any, exists in the entry. As described above, a digital certificate subject name could be used at step 74 to check for an entry in a data store, whereas an existing entry could be checked at step 75 to determine if other extracted information such as an expiry time or validity period has already been stored in the existing entry. At step 77, if the further extracted information is not found in the existing entry, then the existing entry is updated by adding the further extracted information.

When the information extracted from the digital certificate is contact information, a secure messaging flag may be set in the address book entry that includes or has been updated with the extracted contact information at step 79. Such a flag indicates that a corresponding digital certificate is stored for the contact. A user, when addressing a message to the contact, may thereby easily determine whether or not a digital certificate for the contact has been received and loaded and thus whether or not secure messages may be sent to the contact without first obtaining the digital certificate for the contact from an outside digital certificate source. This flag or a further flag or indicator could also be used to cause secure messages to be sent to a contact according to a preferably configurable default secure messaging mode. Alternatively, whenever a message is addressed to a contact with a secure messaging flag set, a user may be prompted to select a messaging mode, including, for example, plaintext mode (no security), or one of multiple signed and/or encrypted secure modes.

When extracted digital certificate information is not found in any existing data store entry, resulting in a negative determination at step 74, a new entry is automatically created at step 78 and fields in the new entry are populated using the extracted information at step 80. At step 82, a secure messaging flag is then set for a new address book entry, as described above. The new entry may then be used similarly to any other entries in the data store, or possibly similar entries in another data store, and may, for example, be edited, deleted, forwarded to other users, displayed and the like. In the case of a new address book entry, the new entry may also be used to address outgoing messages or to replace a sender address in a received message with a familiar name.

Figure 5:
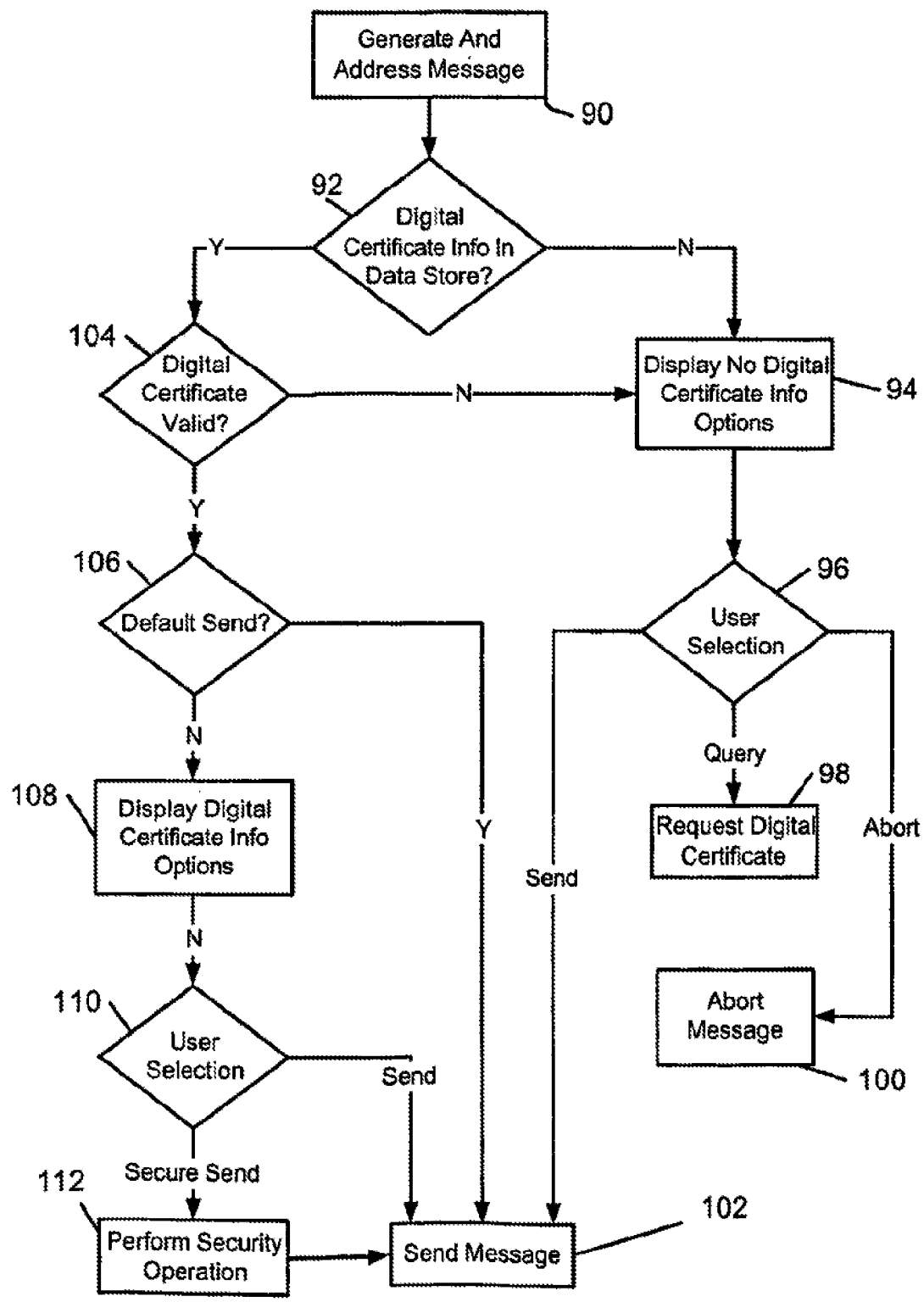
FIG. 5 is a flow diagram illustrating a method of generating and sending messages subject to digital certificate information stored in the digital certificate information storage system.

FIG. 5 is a flow diagram illustrating a method of generating and sending messages subject to digital certificate information stored in the digital certificate information storage system. The method begins at step 90, in which a message is generated at the mobile device 22 and addressed to one or more recipients. The message may be addressed by a user manually selecting an e-mail address from the address book store 56, or by replying to a message previously received at the mobile device 22, for example.

In step 92, the mobile device 22 determines whether digital certificate information is stored in the digital certificate store 54 (or the extracted digital certificate information store 57) for the corresponding entity to which the message is addressed. The determination may be made by checking a secure messaging flag associated with the addressed recipient, or by searching the digital certificate store 54 (or the extracted digital certificate information store 57) for the electronic address of the recipient. If digital certificate information is not stored in the digital certificate store 54, then a list of No Certificate Information options is displayed, as shown in step 94. One of the No Certificate Information options is then selected by a user, as shown in step 96. Illustratively, the No Certificate Information options displayed and optionally selected include an option to request a digital certificate of the addressed recipient, as shown in step 98, to abort the message, as shown in step 100, or to send the message, as shown in step 102.

If the option to request a digital certificate of the addressed recipient is selected, as shown in step 98, then the message is stored at the mobile device 22, and the mobile device 22 sends a request to a digital certificate provider for the digital certificate of the addressed recipient of the message. Upon receiving the digital certificate, the user may select from one of several security operations, such as encrypting the message or a session key using the addressed recipient's public key, for example.

If the option to abort the message is selected, as shown in step 100, then the messaging operation is aborted, and the generated message is not sent.

If the option to send the message is selected, as shown in step 102, then the message is sent in the clear. Of course, the user may digitally sign the message using a private key, and may further attach the user's digital certificate to the outgoing message.

At step 92, if the mobile device 22 determines that digital certificate information is stored in the digital certificate store 54, then the mobile device 22 determines if the digital certificate is a valid digital certificate in step 104. If the digital certificate is not valid, then step 94 is executed, and subsequent steps 96, 98, 100, and 102 may also be executed, as determined by the user.

If the mobile device determines that the digital certificate is a valid digital certificate in step 104, then the mobile device determines if a default send flag has been set, as shown in step 106.

If the default send flag is set, then the message is sent, as shown in step 102. Setting of the default send flag may be done manually by the user, or may be automatic. An automatic setting of the default send flag may be tied to the setting of the secure messaging flag. In one embodiment, the secure messaging flag also performs the function of the default send flag. In another embodiment, the default send flag and the secure messaging flags are separate flags that may be independently set, or as described above.

Sending a message via the default send flag may also include execution of other operations, such as digitally signing the message with the user's private key, attaching the user's digital certificate to the message, or encrypting the message with the addressed recipient's public key.

If the mobile device 22 determines that a default send flag has not been set, then a list of Certificate Information options may be displayed, as shown in step 108. One of the Certificate Information options may be selected by a user, as shown in step 110. Illustratively, the Certificate Information options displayed and optionally selected include an option to perform a security operation on the message, as shown in step 112, or to send the message, as shown in step 102.

If the option to perform a security operation on the message is selected, as shown in step 112, then one or more security operations may be performed on the message before the message is sent, such as digitally signing the message with the user's private key, attaching the user's digital certificate to the message, or encrypting the message with the addressed recipient's public key.

If the option to send the message is selected, as shown in step 102, then the message is sent in the clear. Of course, the user may digitally sign the message using a private key, and may further attach the user's digital certificate to the outgoing message.

The process depicted in FIG. 5 may also be adapted for a plurality of recipients of a single message, such as when the user replies to all recipients of a message previously received at the mobile device 22, or addresses a new message to more than one recipient.

Figure 6:
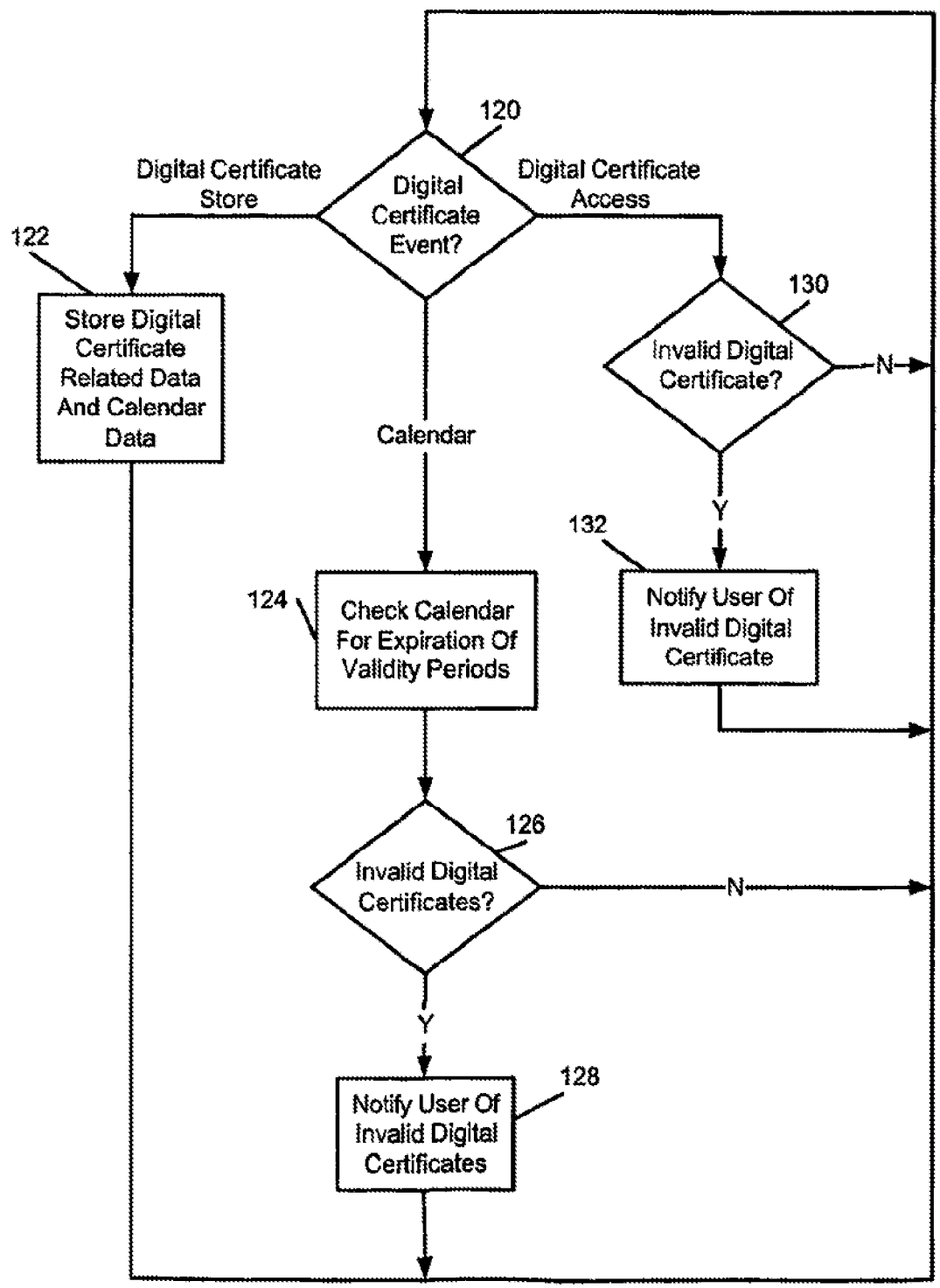
FIG. 6 is a flow diagram illustrating a method of performing digital certificate related operations based on digital certificate related events.

FIG. 6 is a flow diagram illustrating a method of performing digital certificate related operations based on digital certificate related events. At step 120, the system detects the occurrence of a digital certificate event. A digital certificate event is an event or operation that involves a digital certificate, such as receiving digital certificate data to be stored in the digital certificate store, the occurrence of an associated calendar date, or the accessing of a digital certificate, either by the user or by an application program.

If the digital certificate event is a digital certificate store event, then at step 122 digital certificate related data is stored in the digital certificate store and calendar data related to the digital certificate data, such as an expiry date of the digital certificate, is stored in a calendar application store.

If the digital certificate event is a calendar event, then at step 124 the calendar application checks for the expiration of digital certificate validity periods based on the expiry data stored in the calendar application store. A calendar event may occur when the mobile device is turned on and a resident calendar application program checks the calendar data for expiry data, or may alternatively be the occurrence of a calendar event for given expiry data. At step 126, the system determines if invalid (by reason of expiry) digital certificates are found based on the calendar data. If invalid digital certificates are found, then the user is notified of the invalid digital certificates in step 128.

If the digital certificate event is a digital certificate access, then the system determines whether the digital certificate accessed is valid, as shown in step 130. A digital certificate access may occur when a user of the mobile device addresses a message to an address associated with a digital certificate stored in the digital certificate store as previously described, or when the user accesses the digital certificate store and selects a particular digital certificate. At step 132, the system determines if the digital certificate is valid based on the digital certificate data stored in the digital certificate store, validity or expiry information, or a CRL, for example.

If the digital certificate is not valid, then at step 132, the user is notified of the invalid digital certificate.

Figure 7:
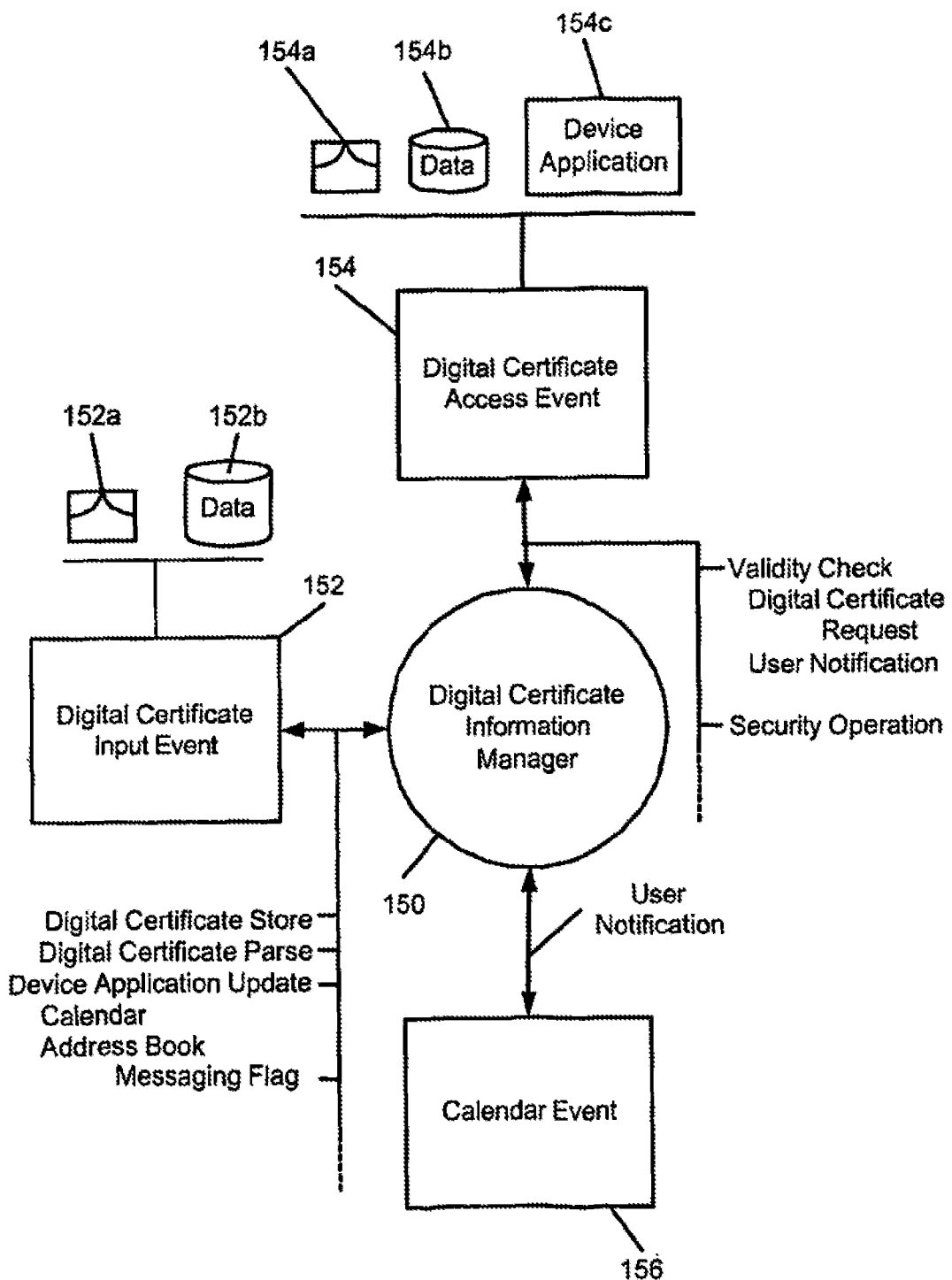
FIG. 7 is a structural block diagram of the digital certificate information storage system.

FIG. 7 is a structural block diagram of an automatic digital certificate information manager system. A digital certificate information manager 150, preferably a software application, is stored and executable on the mobile device 22. In one embodiment, the digital certificate information manager 150 illustratively comprises the digital certificate loader 60 and the digital certificate information injector 62 and related components as described with reference to FIG. 3.

The digital certificate information manager 150 is operable to monitor digital certificate input events 152, digital certificate access events 154, and calendar events 156, and to perform responding functions. For example, if the digital certificate information manager 150 detects a digital certificate input event 152, such as receiving a message 152a comprising a digital certificate or receiving digital certificate data 152b to be stored, then a corresponding digital certificate input event function is performed. Exemplary corresponding digital certificate input event functions include storing digital certificate data in the digital certificate store, parsing digital certificate data, setting a messaging flag related to the digital certificate, or updating mobile device application stores, such as a calendar application or address book application store.

If the digital certificate information manager 150 detects a digital certificate access event 154, such as addressing a message 154a to an address with an associated digital certificate stored in the digital certificate store, accessing the digital certificate store 154b and selecting a digital certificate, or access of a digital certificate by a mobile device software application 154c, then a corresponding digital certificate access event function is performed. Exemplary corresponding digital certificate access event functions include a digital certificate validity check and requesting a new digital certificate, notifying a user in the event of an invalid digital certificate, or performing a security operation, such as signing the message, encrypting the message, and the like.

If the digital certificate information manager 150 detects a calendar event 156, such as the occurrence of a digital certificate expiry date, then the user is notified of the expiration of the digital certificate.

Figure 8:
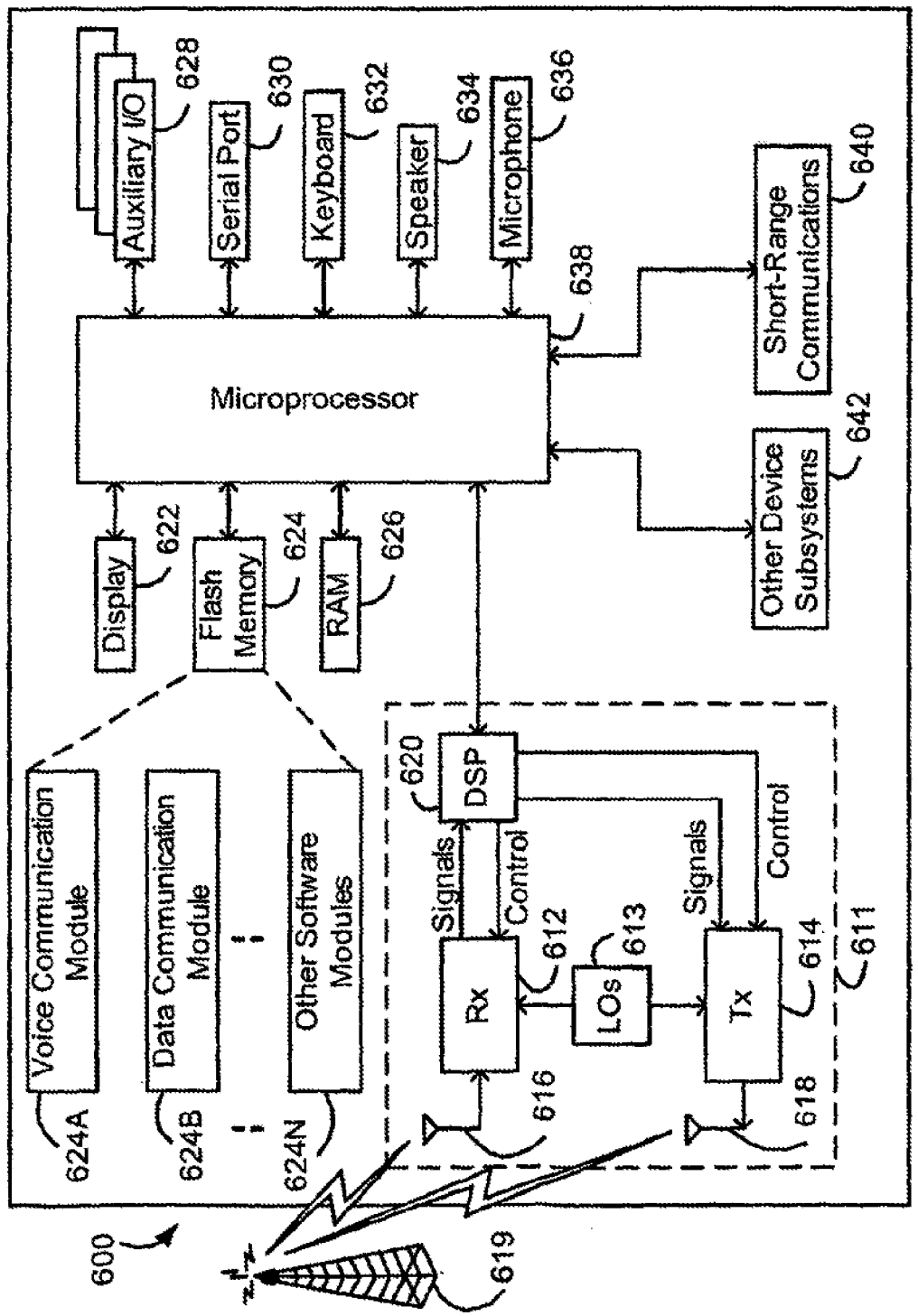
FIG. 8 is a block diagram of a wireless mobile communication device.

FIG. 8 is a block diagram of a wireless mobile communication device, as an example of a device in which the systems and methods disclosed herein may be implemented. The mobile device 600 is preferably a two-way communication device having at least voice and data communication capabilities. The mobile device 600 preferably has the capability to communicate with other computer systems on the Internet. Depending on the functionality provided by the mobile device, the mobile device may be referred to as a data messaging device, a two-way pager, a mobile telephone with data messaging capabilities, a wireless Internet appliance, or a data communication device (with or without telephony capabilities). As mentioned above, such devices are referred to generally herein simply as mobile devices.

The mobile device 600 includes a transceiver 611, a microprocessor 638, a display 622, a Flash memory 624, a random access memory (RAM) 626, auxiliary input/output (I/O) devices 628, a serial port 630, a keyboard 632, a speaker 634, a microphone 636, a short-range wireless communications sub-system 640, and other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the Flash memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

The mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 8 by the communication tower 619. These voice and data networks may be separate communication networks using separate infrastructure, such as base stations, network controllers, etc., or they may be integrated into a single wireless network. References to the network 619 should therefore be interpreted as encompassing both a single voice and data network and separate networks.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 8, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., is dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the mobile device 600 may also vary. For example, in the Mobitex and DataTAC data networks, mobile devices are registered on the network using a unique identification number associated with each device. In GPRS data networks, however, network access is associated with a subscriber or user of the mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to Carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for such operations as signal amplification, frequency down conversion, filtering, channel selection, and analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 8 for both voice and data communications, it is possible that the mobile device 600 may include two distinct transceivers, a first transceiver for transmitting and receiving voice signals, and a second transceiver for transmitting and receiving data signals. Multiple transceiver may also be provided in a mobile device adapted to operate within more than one communication network or multiple frequency bands.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the Flash memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619. On the mobile device 600, a secure messaging software application, incorporating software modules corresponding to the digital certificate loader 60 and digital certificate information injector 62 in FIG. 3 for example, may operate in conjunction with the data communication module 624B in order to implement the techniques described above.

The microprocessor 638 also interacts with other device subsystems, such as the display 622, the Flash memory 624, the RAM 626, the auxiliary input/output (I/O) subsystems 628, the serial port 630, the keyboard 632, the speaker 634, the microphone 636, the short-range communications subsystem 640, and any of the other device subsystems generally designated as 642. For example, the modules 624A-N are executed by the microprocessor 638 and may provide a high-level interface between a user and the mobile device 600. This interface typically includes a graphical component provided through the display 622, and an input/output component provided through the auxiliary I/O 628, the keyboard 632, the speaker 634, or the microphone 636. Such interfaces are designated generally as the keyboard/UI 64 in FIG. 3.

Some of the subsystems shown in FIG. 8 perform communication-related functions, whereas other subsystems may provide "resident" or on-device functions. Notably, some subsystems, such as the keyboard 632 and the display 622 are used for both communication-related functions, such as entering a text message for transmission over a data communication network, and device-resident functions such as a calculator or task list or other PDA type functions.

Operating system software used by the microprocessor 638 is preferably stored in a non-volatile store such as Flash memory 624. In addition to the operating system and communication modules 624A-N, the Flash memory 624 may also include a file system for storing data. A storage area is also preferably provided in the Flash memory 624 to store digital certificates, address book entries, reminder or appointment information, and possibly other information. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in the Flash memory 624.

An exemplary application module 624N that may be loaded onto the dual-mode device 600 is a personal information manager (PIM) application providing PDA functionality, such as calendar events, appointments, and task items. Such a module could use expiry or validity period information extracted from a digital certificate and stored in an appropriate data store, in Flash memory 624 or RAM 626 for example, to provide a digital certificate expiry or like reminder to a user of the mobile device 600. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The Flash memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

Although shown as a Flash memory 624, those skilled in the art will appreciate that other types of non-volatile store, such as a battery backed-up RAM, for example, could be used in addition to or instead of the Flash memory 624.

The mobile device 600 may also be manually synchronized with a host system by placing the mobile device 600 in an interface cradle, which couples the serial port 630 of the mobile device 600 to the serial port of the host system. The serial port 630 may also be used to enable a user to set preferences through an external device or software application, to download other application modules 624N for installation, and to load digital certificates onto a device as described above. This wired download path may be used to load an encryption key onto the device, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A digital certificate received by the transceiver 611, in response to a request to a PKS or attached to a secure message for example, is processed as described above to add the digital certificate to a digital certificate store in the Flash memory 624 if it has not already been stored, and to extract and store digital certificate information in one or more data stores in the Flash memory 624 if necessary. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. In addition, the secure messaging techniques described above might not necessarily be applied to voice communications. Alternative voice or audio 110 subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

The short-range communications subsystem 640 may include an infrared device and associated circuits and components, or a short-range wireless communication module such as a Bluetooth™ module or an 802.11 module to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless LANs, respectively.

Variations of the system and method disclosed herein may also be used. For example, although a wireless mobile communication device is shown in FIGS. 3 and 5 and described as one possible messaging client, the system and method disclosed herein may also be implemented in other messaging clients, including desktop and laptop computer systems, networked computer systems and other types of messaging clients.

The digital certificate information storage system may also be configurable, such that new data store entries are created only under certain conditions, depending upon communications functionality of a messaging client or user preferences. For example, if a messaging client is an email client but a digital certificate does not contain an email address, then a contact information storage system may be configured such that no new address book entry would be created, since information required for messaging operations is not available from the digital certificate.

Figure 9:
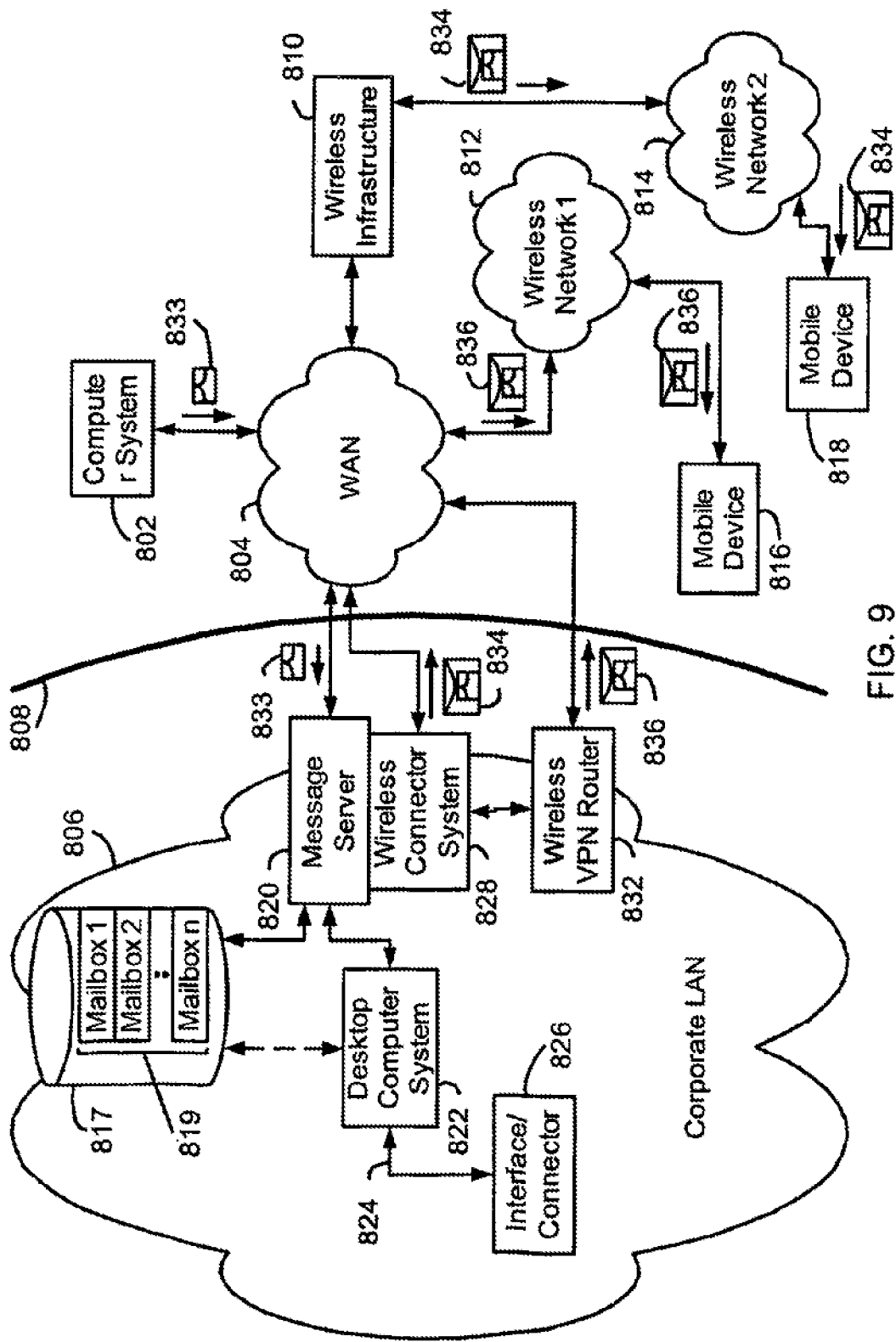
FIG. 9 is a block diagram showing an example communication system.
Figure 10:
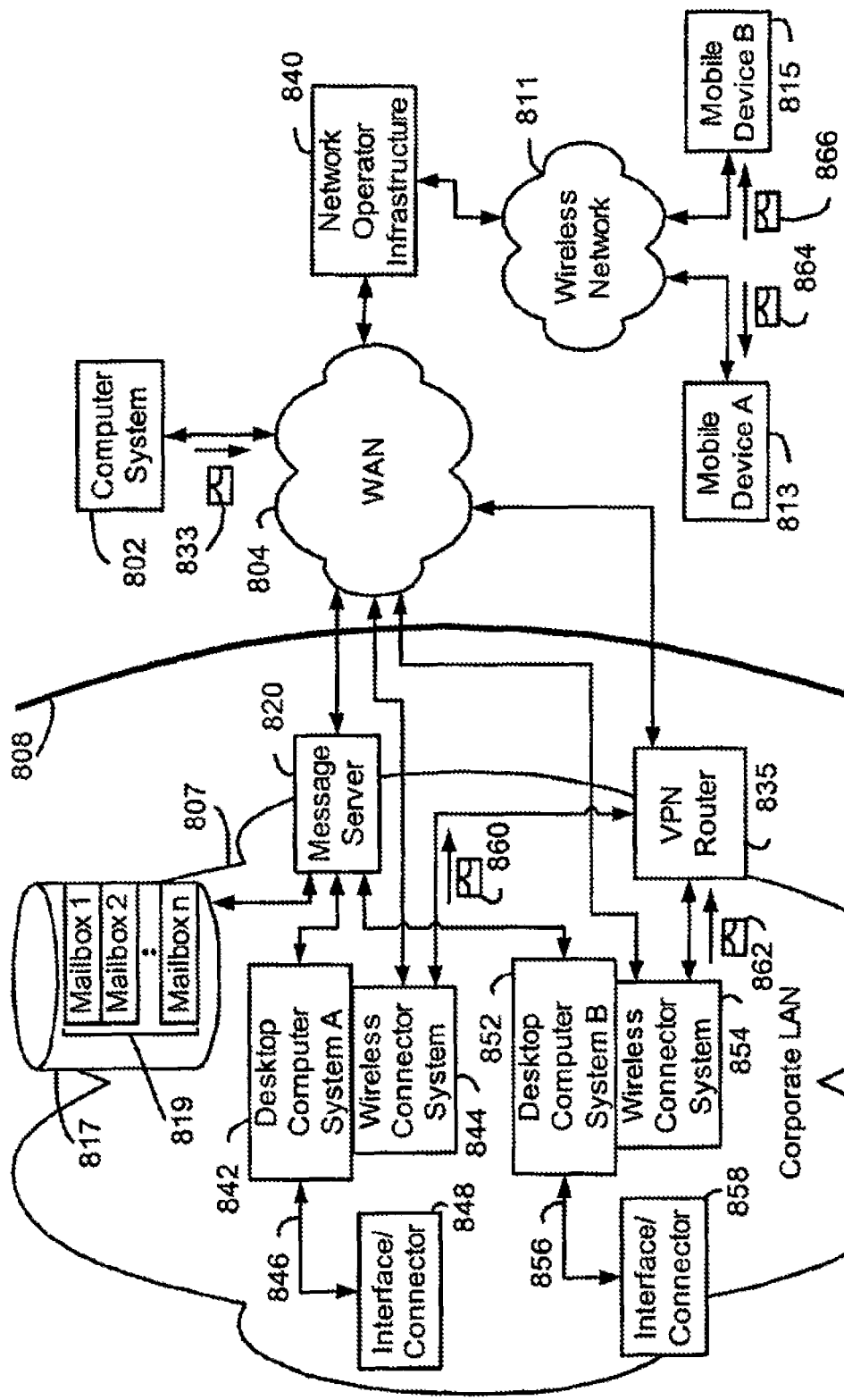
FIG. 10 is a block diagram of an alternative communication system.
Figure 11:
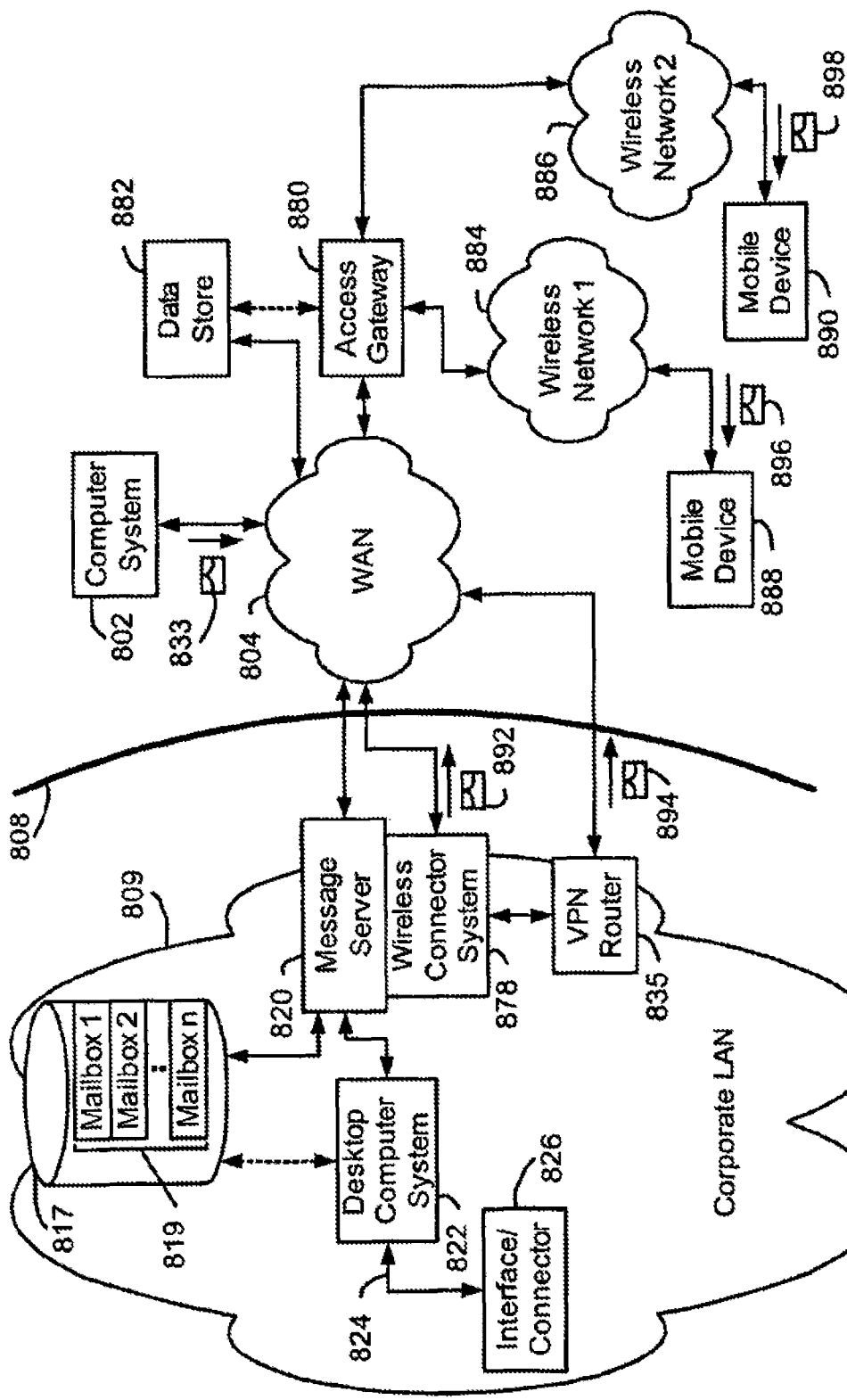
FIG. 11 is a block diagram of another alternative communication system.

FIGS. 9-11 describe additional communication systems in which a digital certificate information storage system may be used. FIG. 9 is a block diagram showing an example communication system. In FIG. 9, there is shown a computer system 802, a WAN 804, corporate LAN 806 behind a security firewall 808, wireless infrastructure 810, wireless networks 812 and 814, and mobile devices 816 and 818. The corporate LAN 806 includes a message server 820, a wireless connector system 828, a data store 817 including at least a plurality of mailboxes 819, a desktop computer system 822 having a communication link directly to a mobile device such as through physical connection 824 to an interface or connector 826, and a wireless VPN router 832. Operation of the system in FIG. 9 is described below with reference to the messages 833, 834 and 836.

The computer system 802 is, for example, a laptop, desktop or palmtop computer system configured for connection to the WAN 804. Such a computer system may connect to the WAN 804 via an ISP or ASP. Alternatively, the computer system 802 may be a network-connected computer system that, like the computer system 822 for example, accesses the WAN 804 through a LAN or other network. Many modern mobile devices are enabled for connection to a WAN through various infrastructure and gateway arrangements, so that the computer system 802 may also be a mobile device.

The corporate LAN 806 is an illustrative example of a central, server-based messaging, system that has been enabled for wireless communications. The corporate LAN 806 may be referred to as a "host system", in that it hosts both a data store 817 with mailboxes 819 for messages, as well as possibly further data stores (not shown) for other data items, that may be sent to or received from mobile devices 816 and 818, and the wireless connector system 828, the wireless VPN router 832, or possibly other components enabling communications between the corporate LAN 806 and one or more mobile devices 816 and 818. In more general terms, a host system is one or more computers at, with, or in association with which a wireless connector system is operating. The corporate LAN 806 is one preferred embodiment of a host system, in which the host system is a server computer running within a corporate network environment operating behind and protected by at least one security firewall 808. Other possible central host systems include ISP, ASP and other service provider or mail systems. Although the desktop computer system 824 and interface/connector 826 may be located outside such host systems, wireless communication operations may be similar to those described below.

The corporate LAN 806 implements the wireless connector system 828 as an associated wireless communications enabling component, which will normally be a software program, a software application, or a software component built to work with at least one message server 820. The wireless connector system 828 is used to send user-selected information to, and to receive information from, one or more mobile devices 816 and 818, via one or more wireless networks 812 and 814. The wireless connector system 828 may be a separate component of a messaging system, as shown in FIG. 9, or may instead be partially or entirely incorporated into other communication system components. For example, the message server 820 may incorporate a software program, application, or component implementing the wireless connector system 828, portions thereof, or some or all of its functionality.

The message server 820, running on a computer behind the firewall 808, acts as the main interface for the corporation to exchange messages, including for example electronic mail, calendaring data, voice mail, electronic documents, and other PIM data with a WAN 804, such as the Internet. The particular intermediate operations and computers are dependent upon the specific type of message delivery mechanisms and networks via which messages are exchanged, and therefore have not been shown in FIG. 9. The functionality of the message server 820 may extend beyond message sending and receiving, providing such features as dynamic database storage for data like calendars, to-do lists, task lists, e-mail, and documentation, as described above.

Message servers such as 820 normally maintain a plurality of mailboxes 819 in one or more data stores such as 817 for each user having an account on the server. The data store 817 includes mailboxes 819 for a number ("n") of user accounts. Messages received by the message server 820 that identify a user, a user account, a mailbox, or possibly another address associated with a user, account or mailbox 819, as a message recipient is typically stored in the corresponding mailbox 819. If a message is addressed to multiple recipients or a distribution list, then copies of the same message may be stored to more than one mailbox 819. Alternatively, the message server 820 may store a single copy of such a message in a data store accessible to all of the users having an account on the message server 820, and store a pointer or other identifier in each recipient's mailbox 819. In typical messaging systems, each user then accesses his or her mailbox 819 and its contents using a messaging client such as Microsoft Outlook or Lotus Notes, which normally operates on a PC, such as the desktop computer system 822, connected in the LAN 806. Although only one desktop computer system 822 is shown in FIG. 9, those skilled in the art will appreciate that a LAN typically contains many desktop, notebook, and laptop computer systems. Each messaging client normally accesses a mailbox 819 through the message server 820, although in some systems, a messaging client may enable direct access to the data store 817 and a mailbox 819 stored thereon by the desktop computer system 822. Messages may also be downloaded from the data store 817 to a local data store on the desktop computer system 822.

Within the corporate LAN 806, the wireless connector system 828 operates in conjunction with the message server 820. The wireless connector system 828 may reside on the same computer system as the message server 820, or may instead be implemented on a different computer system. Software implementing the wireless connector system 828 may also be partially or entirely integrated with the message server 820. The wireless connector system 828 and the message server 820 are preferably designed to cooperate and interact to allow the pushing of information to the mobile devices 816, 818. In such an installation, the wireless connector system 828 is preferably configured to send information that is stored in one or more data stores associated with the corporate LAN 806 to one or more of the mobile devices 816, 818, through the corporate firewall 808 and via the WAN 804 and one of the wireless networks 812, 814. For example, a user that has an account and associated mailbox 819 in the data store 817 may also have a mobile device, such as 816. As described above, messages received by the message server 820 that identify a user, account, or mailbox 819 are stored to a corresponding mailbox 819 by the message server 820. If a user has a mobile device, such as 816, messages received by the message server 820 and stored to the user's mailbox 819 are preferably detected by the wireless connector system 828 and sent to the user's mobile device 816. This type of functionality represents a "push" message sending technique. The wireless connector system 828 may instead employ a "pull" technique, in which items stored in a mailbox 819 are sent to a mobile device 816 or 818 responsive to a request or access operation made using the mobile device, or some combination of both techniques.

The use of a wireless connector 828 thereby enables a messaging system including a message server 820 to be extended so that each user's mobile device 816, 818 has access to stored messages of the message server 820. Although the systems and methods described herein are not restricted solely to a push-based technique, a more detailed description of push-based messaging may be found in the United States Patent incorporated by reference above. This push technique uses a wireless friendly encoding, compression and encryption technique to deliver all information to a mobile device, thus effectively extending the company firewall 808 to include the mobile devices 816 and 818.

As shown in FIG. 9, there are several paths for exchanging information with a mobile device 816, 818 from the corporate LAN 806. One possible information transfer path is through the physical connection 824 such as a serial port, using an interface or connector 826. This path is useful for example for bulk information updates often performed at initialization of a mobile device 816, 818 or periodically when a user of a mobile device 816, 818 is working at a computer system in the LAN 806, such as the computer system 822. For example, as described above, PIM data is commonly exchanged over a such a connection as a serial port connected to a cradle in or upon which a mobile device 816, 818 may be placed. The physical connection 824 may also be used to transfer other information from a desktop computer system 822 to a mobile device 816, 818, including private security keys ("private keys") such as private encryption or digital signature keys associated with the desktop computer system 822, or other relatively bulky information such as digital certificates and CRLs.

Private key exchange using the physical connection 824 and the connector or interface 826 allows a user's desktop computer system 822 and mobile device 816 or 818 to share at least one identity for accessing all encrypted and/or signed mail. The user's desktop computer system 822 and mobile device 816 or 818 can also thereby share private keys so that either the host system 822 or the mobile device 816 or 818 can process secure messages addressed to the user's mailbox or account on the message server 820. The transfer of digital certificates and CRLs over such a physical connection is desirable in that they represent a large amount of the data that is required for S/MIME, PGP and other public key security methods. A user's own digital certificate, a chain of digital certificates used to verify the user's digital certificate, and a CRL, as well as digital certificates, digital certificate chains and CRLs for other users, may be loaded onto a mobile device 816, 818 from the user's desktop computer system 822. This loading of other user's digital certificates and CRLs onto a mobile device 816, 818 allows a mobile device user to select other entities or users with whom they might be exchanging secure messages, and to pre-load the bulky information onto the mobile device through a physical connection instead of over the air, thus saving time and wireless bandwidth when a secure message is received from or to be sent to such other users, or when the status of a digital certificate is to be determined based on one or more CRLs. CRL-based status checks can also be avoided where the systems and methods described herein are employed.

In known "synchronization" type wireless messaging systems, a physical path has also been used to transfer messages from mailboxes 819 associated with a message server 820 to mobile devices 816 and 818.

Another method for data exchange with the mobile devices 816 and 818 is over-the-air, through the wireless connector system 828 and using the wireless networks 812 and 814. As shown in FIG. 8, this could involve a Wireless VPN router 832, if available in the network 806, or, alternatively, a traditional WAN connection to wireless infrastructure 810 that provides an interface to one or more wireless networks such as 814. The Wireless VPN router 832 provides for creation of a VPN connection directly through a specific wireless network 812 to a wireless device 816. Such a Wireless VPN router 832 may be used in conjunction with a static addressing scheme. For example, if the wireless network 812 is an IP-based wireless network, then IPV6 would provide enough IP addresses to dedicate an IP address to every mobile device 816 configured to operate within the network 812 and thus make it possible to push information to a mobile device 816 at any time. A primary advantage of using a wireless VPN router 832 is that it could be an off-the-shelf VPN component which would not require wireless infrastructure 810. VPN connection may use a TCP/IP or UDP/IP connection to deliver messages directly to and from a mobile device 816.

If a wireless VPN router 832 is not available, then a link to a WAN 804, normally the Internet, is a commonly used connection mechanism that may be employed by the wireless connector system 828. To handle the addressing of the mobile device 816 and any other required interface functions, wireless infrastructure 810 is preferably used. The wireless infrastructure 810 may also determine a most likely wireless network for locating a given user, and track users as they roam between countries or networks. In wireless networks such as 812 and 814, messages are normally delivered to and from mobile devices via RF transmissions between base stations and the mobile devices.

A plurality of connections to wireless networks 812 and 814 may be provided, including, for example, ISDN, Frame Relay or T1 connections using the TCP/IP protocol used throughout the Internet. The wireless networks 812 and 814 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure, such as any of those described above.

In some implementations, more than one over-the-air information exchange mechanism may be provided in the corporate LAN 806. In FIG. 9 for example, the mobile devices 816 and 818 associated with users having mailboxes 819 associated with user accounts on the message server 820 are configured to operate on different wireless networks 812 and 814. If the wireless network 812 supports IPv6 addressing, then the wireless VPN router 832 may be used by the wireless connector system 828 to exchange data with any mobile device 816 operating within the wireless network 812. The wireless network 814 may be a different type of wireless network, however, such as the Mobitex network, in which case information is instead exchanged with the mobile device 818 operating within the wireless network 814 via a connection to the WAN 804 and the wireless infrastructure 810.

Operation of the system in FIG. 9 will now be described using an example of an e-mail message 833 sent from the computer system 802 and addressed to at least one recipient having both an account and mailbox 819 or like data store associated with the message server 820 and a mobile device 816 or 818. However, the e-mail message 833 is intended for illustrative purposes only. The exchange of other types of information between the corporate LAN 806 is preferably also enabled by the wireless connector system 828.

The e-mail message 833, sent from the computer system 802 via the WAN 804, may be fully in the clear, or signed with a digital signature and/or encrypted, depending upon the particular messaging scheme used. For example, if the computer system 802 is enabled for secure messaging using S/MIME, then the e-mail message 833 may be signed, encrypted, or both.

E-mail messages such as 833 normally use traditional SMTP, RFC822 headers and MIME body parts to define the format of the e-mail message. These techniques are all well known to one in the art. The e-mail message 833 arrives at the message server 820, which determines into which mailboxes 819 the e-mail message 833 should be stored. As described above, a message such as the e-mail message 833 may include a user name, a user account, a mailbox identifier, or other type of identifier that is mapped to a particular account or associated mailbox 819 by the message server 820. For an e-mail message 833, recipients are typically identified using e-mail addresses corresponding to a user account and thus a mailbox 819.

The wireless connector system 828 sends or mirrors, via the wireless network 812 or 814, certain user-selected data items or parts of data items from the corporate LAN 806 to the user's mobile device 816 or 818, preferably upon detecting that one or more triggering events has occurred. A triggering event includes, but is not limited to, one or more of the following: screen saver activation at a user's networked computer system 822, disconnection of the user's mobile device 816 or 818 from the interface 826, or receipt of a command sent from a mobile device 816 or 818 to the host system to start sending one or more messages stored at the host system. Thus, the wireless connector system 828 may detect triggering events associated with the message server 820, such as receipt of a command, or with one or more networked computer systems 822, including the screen saver and disconnection events described above. When wireless access to corporate data for a mobile device 816 or 818 has been activated at the LAN 806, for example when the wireless connector system 828 detects the occurrence of a triggering event for a mobile device user, data items selected by the user are preferably sent to the user's mobile device. In the example of the e-mail message 833, assuming that a triggering event has been detected, the arrival of the message 833 at the message server 820 is detected by the wireless connector system 828. This may be accomplished, for example, by monitoring or querying mailboxes 819 associated with the message server 820, or, if the message server 820 is a Microsoft Exchange server, then the wireless connector system 828 may register for advise syncs provided by the Microsoft Messaging Application Programming Interface (MAPI) to thereby receive notifications when a new message is stored to a mailbox 819.

When a data item such as the e-mail message 833 is to be sent to a mobile device 816 or 818, the wireless connector system 828 preferably repackages the data item in a manner that is transparent to the mobile device 816 or 818, so that information sent to and received by the mobile device 816 or 818 appears similar to the information as stored on and accessible at the host system, LAN 806 in FIG. 9. One preferred repackaging method includes wrapping received messages to be sent via a wireless network 812 or 814 in an electronic envelope, that corresponds to the wireless network address of the mobile device 816 or 818 to which the message is to be sent. Alternatively, other repackaging methods could be used, such as special-purpose TCP/IP wrapping techniques. Such repackaging preferably also results in e-mail messages sent from a mobile device 816 or 818 appearing to come from a corresponding host system account or mailbox 819 even though they are composed and sent from a mobile device. A user of a mobile device 816 or 818 may thereby effectively share a single e-mail address between a host system account or mailbox 819 and the mobile device.

Repackaging of the e-mail message 833 is indicated at 834 and 836. Repackaging techniques may be similar for any available transfer paths or may be dependent upon the particular transfer path, either the wireless infrastructure 810 or the wireless VPN router 832. For example, the e-mail message 833 is preferably compressed and encrypted, either before or after being repackaged at 834, to thereby provide for secure transfer to the mobile device 818. Compression reduces the bandwidth required to send the message, whereas encryption ensures confidentiality of any messages or other information sent to the mobile devices 816 and 818. In contrast, messages transferred via a VPN router 832 might only be compressed and not encrypted, since a VPN connection established by the VPN router 832 is inherently secure. Messages are thereby securely sent, via either encryption at the wireless connector system 828, which may be considered a non-standard VPN tunnel or a VPN-like connection, for example, or the VPN router 832, to mobile devices 816 and 818. Accessing messages using a mobile device 816 or 818 is thus no less secure than accessing mailboxes at the LAN 806 using the desktop computer system 822.

When a repackaged message 834 or 836 arrives at a mobile device 816 or 818, via the wireless infrastructure 810, or via the wireless VPN router 832, the mobile device 816 or 818 removes the outer electronic envelope from the repackaged message 834 or 836, and performs any required decompression and decryption operations. Messages sent from a mobile device 816 or 818 and addressed to one or more recipients are preferably similarly repackaged, and possibly compressed and encrypted, and sent to a host system such as the LAN 806. The host system may then remove the electronic envelope from the repackaged message, decrypt and decompress the message if desired, and route the message to the addressed recipients.

Another goal of using an outer envelope is to maintain at least some of the addressing information in the original e-mail message 833. Although the outer envelope used to route information to mobile devices 816, 818 is addressed using a network address of one or more mobile devices, the outer envelope preferably encapsulates the entire original e-mail message 833, including at least one address field, possibly in compressed and/or encrypted form. This allows original "To", "From" and "CC" addresses of the e-mail message 833 to be displayed when the outer envelope is removed and the message is displayed on a mobile device 816 or 818. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 828. Using the user's account or mailbox address from the mobile device 816 or 818 allows a message sent from a mobile device to appear as though the message originated from the user's mailbox 819 or account at the host system rather than the mobile device.

FIG. 10 is a block diagram of an alternative communication system, in which wireless communications are enabled by a component associated with an operator of a wireless network. As shown in FIG. 10, the system includes a computer system 802, WAN 804, a corporate LAN 807 located behind a security firewall 808, network operator infrastructure 840, a wireless network 811, and mobile devices 813 and 815. The computer system 802, the WAN 804, the security firewall 808, the message server 820, the data store 817, the mailboxes 819, and the VPN router 835 are substantially the same as the similarly-labelled components in FIG. 9. However, since the VPN router 835 communicates with the network operator infrastructure 840, it need not necessarily be a wireless VPN router in the system of FIG. 10. The network operator infrastructure 840 enables wireless information exchange between the LAN 807 and the mobile devices 813 and 815, respectively associated with the computer systems 842 and 852 and configured to operate within the wireless network 811. In the LAN 807, a plurality of desktop computer systems 842 and 852 are shown, each having a physical connection 846 or 856 to an interface or connector 848 or 858. A wireless connector system 844 or 854 is operating on or in conjunction with each computer system 842 and 852.

The wireless connector systems 844 and 854 are similar to the wireless connector system 828 described above, in that they enable data items, such as e-mail messages and other items that are stored in mailboxes 819, and possibly data items stored in a local or network data store, to be sent from the LAN 807 to one or more of the mobile devices 813 and 815. In FIG. 10 however, the network operator infrastructure 840 provides an interface between the mobile devices 813 and 815 and the LAN 807. As above, operation of the system shown in FIG. 10 is described below in the context of an e-mail message as an illustrative example of a data item that may be sent to a mobile device 813 or 815.

When an e-mail message 833, addressed to one or more recipients having an account on the message server 820, is received by the message server 820, the message, or possibly a pointer to a single copy of the message stored in a central mailbox or data store, is stored in the mailbox 819 of each such recipient. Once the e-mail message 833 or pointer has been stored to a mailbox 819, it may preferably be accessed using a mobile device 813 or 815. In the example shown in FIG. 10, the e-mail message 833 has been addressed to the mailboxes 819 associated with both desktop computer systems 842 and 852 and thus both mobile devices 813 and 815.

As those skilled in the art will appreciate, communication network protocols commonly used in wired networks such as the LAN 807 and/or the WAN 804 are not suitable or compatible with wireless network communication protocols used within wireless networks such as 811. For example, communication bandwidth, protocol overhead, and network latency, which are primary concerns in wireless network communications, are less significant in wired networks, which typically have much higher capacity and speed than wireless networks. Therefore, mobile devices 813 and 815 cannot normally access the data store 817 directly. The network operator infrastructure 840 provides a bridge between the wireless network 811 and the LAN 807.

The network operator infrastructure 840 enables a mobile device 813 or 815 to establish a connection to the LAN 807 through the WAN 804, and may, for example, be operated by an operator of the wireless network 811 or a service provider that provides wireless communication service for mobile devices 813 and 815. In a pull-based system, a mobile device 813 or 815 establishes a communication session with the network operator infrastructure 840 using a wireless network compatible communication scheme, preferably a secure scheme such as Wireless Transport Layer Security (WTLS) when information should remain confidential, and a wireless web browser such as a Wireless Application Protocol (WAP) browser. A user then requests, through manual selection or pre-selected defaults in the software residing in the mobile device, any or all information, or just new information, for example, stored in a mailbox 819 in the data store 817 at the LAN 807. The network operator infrastructure 840 establishes a connection or session with a wireless connector system 844, 854, using Secure Hypertext Transfer Protocol (HTTPS), for example, if no session has already been established. As above, a session between the network operator infrastructure 840 and a wireless connector system 844 or 854 may be made via a typical WAN connection or through the VPN router 835 if available. When time delays between receiving a request from a mobile device 813 or 815 and delivering requested information back to the device are to be minimized, the network operator infrastructure 840 and the wireless connector systems 844 and 854 may be configured so that a communication connection remains open once established.

In the system of FIG. 10, requests originating from mobile device A 813 and B 815 would be sent to the wireless connector systems 844 and 854, respectively. Upon receiving a request for information from the network operator infrastructure 840, a wireless connector system 844 or 854 retrieves requested information from a data store. For the e-mail message 833, the wireless connector system 844 or 854 retrieves the e-mail message 833 from the appropriate mailbox 819, typically through a messaging client operating in conjunction with the computer system 842 or 852, which may access a mailbox 819 either via the message server 820 or directly. Alternatively, a wireless connector system 844 or 854 may be configured to access mailboxes 819 itself, directly or through the message server 820. Also, other data stores, both network data stores similar to the data store 817 and local data stores associated with each computer system 842 and 852, may be accessible to a wireless connector system 844 or 854, and thus to a mobile device 813 or 815.

If the e-mail message 833 is addressed to the message server accounts or mailboxes 819 associated with both computer systems 842 and 852 and devices 813 and 815, then the e-mail message 833 is sent to the network operator infrastructure 840 as shown at 860 and 862, which then sends a copy of the e-mail message to each mobile device 813 and 815, as indicated at 864 and 866. Information is transferred between the wireless connector systems 844 and 854 and the network operator infrastructure 840 via either a connection to the WAN 804 or the VPN router 835. When the network operator infrastructure 840 communicates with the wireless connector systems 844 and 854 and the mobile devices 813 and 815 via different protocols, translation operations may be performed by the network operator infrastructure 840. Repackaging techniques may also be used between the wireless connector systems 844 and 854 and the network operator infrastructure 840, and between each mobile device 813 and 815 and the network operator infrastructure 840.

Messages or other information to be sent from a mobile device 813 or 815 may be processed in a similar manner, with such information first being transferred from a mobile device 813 or 815 to the network operator infrastructure 840. The network operator infrastructure 840 then sends the information to a wireless connector system 844 or 854 for storage in a mailbox 819 and delivery to any addressed recipients by the message server 820, for example, or may alternatively deliver the information to the addressed recipients.

The above description of the system in FIG. 10 relates to pull-based operations. The wireless connector systems 844 and 854 and the network operator infrastructure may instead be configured to push data items to mobile devices 813 and 815. A combined push/pull system is also possible. For example, a notification of a new message or a list of data items currently stored in a data store at the LAN 807 could be pushed to a mobile device 813 or 815, which may then be used to request messages or data items from the LAN 807 via the network operator infrastructure 840.

If mobile devices associated with user accounts on the LAN 807 are configured to operate within different wireless networks, then each wireless network may have an associated wireless network infrastructure component similar to 840.

Although separate, dedicated wireless connector systems 844 and 854 are shown for each computer system 842 and 852 in the system of FIG. 10, one or more of the wireless connector systems 844 and 854 is preferably configured to operate in conjunction with more than one of the computer systems 842 and 852, or to access a data store or mailbox 819 associated with more than one computer system. For example, the wireless connector system 844 may be granted access to the mailboxes 819 associated with both the computer system 842 and the computer system 852. Requests for data items from either mobile device A 813 or B 815 are then processed by the wireless connector system 844. This configuration is useful to enable wireless communications between the LAN 807 and the mobile devices 813 and 815 without requiring a desktop computer system 842 and 852 to be running for each mobile device user. A wireless connector system may instead be implemented in conjunction with the message server 820 to enable wireless communications.

FIG. 11 is a block diagram of another alternative communication system. The system includes a computer system 802, WAN 804, a corporate LAN 809 located behind a security firewall 808, an access gateway 880, a data store 882, wireless networks 884 and 886, and mobile devices 888 and 890. The computer system 802, the WAN 804, the security firewall 808, the message server 820, the data store 817, the mailboxes 819, the desktop computer system 822, the physical connection 824, the interface or connector 826 and the VPN router 835 are substantially the same as the corresponding components described above. The access gateway 880 and data store 882 provide mobile devices 888 and 890 with access to data items stored at the LAN 809. In FIG. 11, a wireless connector system 878 operates on or in conjunction with the message server 820, although a wireless connector system may instead operate on or in conjunction with one or more desktop computer systems 822 in the LAN 809.

The wireless connector system 878 provides for transfer of data items stored at the LAN 809 to one or more of the mobile devices 888 and 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 are stored into the mailbox 819 of each such recipient. In the system of FIG. 11, the external data store 882 preferably has a similar structure to, and remains synchronized with, the data store 817. PIM information or data stored at data store 882 preferably is independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888 or 890 through the access gateway 880.

In the case of the e-mail message 833, for example, an update sent to the data store 882 some time after the e-mail message 833 is received indicates that the message 833 has been stored in a certain mailbox 819 in the store 817, and a copy of the e-mail message is stored to a corresponding storage area in the data store 882. When the e-mail message 833 has been stored in the mailboxes 819 corresponding to the mobile devices 888 and 890, one or more copies of the e-mail message, indicated at 892 and 894 in FIG. 11, will be sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as IMPS or Secure Sockets Layer (SSL) may be used. Those skilled in the art will appreciate that a single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 connect to the WAN 804. A WAP browser or other browser compatible with the wireless networks 884 and 886 may then be used to access the data store 882, which is synchronized with the data store 817, and download stored data items either automatically or responsive to a request from a mobile device 888 or 890. As shown at 896 and 898, copies of the e-mail message 833, which was stored in the data store 817, are sent to the mobile devices 888 and 890. A data store on each mobile device 888 and 890 is thereby synchronized with a portion, such as a mailbox 819, of a data store 817 on a corporate LAN 809. Changes to a mobile device data store are similarly reflected in the data stores 882 and 817.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A method performed by a wireless mobile communication device for flagging address book entries, the method comprising:
   receiving, by the wireless mobile communication device, a digital certificate;
   extracting, by the wireless mobile communication device, a set of contact information from the digital certificate associated with a sender of the digital certificate;
   analyzing, based on the set of contact information, a set of address book entries of an address book stored in a memory of the wireless mobile communication device, wherein each of the set of address book entries comprises contact information associated with a given entity;
   determining, by the wireless mobile communication device, whether digital certificate information associated with the digital certificate is already stored in at least one of the set of an address book entries based on analyzing the set of address book entries; and
   storing, by the wireless mobile communication device, the digital certificate information in the address book in association with an address book entry corresponding to the received digital certificate and setting a secure message flag within the address book entry corresponding to the received digital certificate, based on determination that the received digital certificate information is not already stored in the memory of the wireless mobile communication device, wherein the secure message flag indicates that a corresponding digital certificate is stored for a contact of the address book entry.

2. The method of claim 1, further comprising:
   setting the secure message flag for the address book entry corresponding to the received digital certificate when it is determined that both (1) the received digital certificate information is already stored in association with the address book entry in the memory, and (2) the secure message flag is not set.

3. The method of claim 1, further comprising:
   creating the address book entry corresponding to the received digital certificate prior to the storing of the digital certificate information in association with the address book entry.

4. The method of claim 1, wherein the digital certificate information comprises a digital certificate.

5. The method of claim 1, further comprising:
   extracting the digital certificate information from a digital certificate.

6. The method of claim 1, further comprising:
   setting a default send flag, the default flag indicating that messages addressed to a contact for the address book entry are to be sent in a default manner.

7. The method of claim 4, further comprising using the digital certificate to send secure messages to a contact of the address book entry.

8. A method performed by a client wireless mobile communication device, the method comprising:
   obtaining a message addressed to a recipient;
   determining whether a secure message flag of an address book entry associated with the recipient is set, the secure message flag indicating whether digital certificate information associated with the recipient is stored in a memory of the wireless mobile communication device, the address book entry stored in an address book in the memory of the wireless mobile communication device, to determine whether the digital certificate information associated with the recipient is stored in the memory of the wireless mobile communication device; and
   performing a security operation prior to sending the message, based on determination that the secure message flag is set.

9. The method of claim 8, further comprising:
   sending a request to a digital certificate provider for a digital certificate for the recipient when it is determined that the secure message flag of the address book entry associated with the recipient is not set.

10. The method of claim 8, further comprising aborting the messaging operation or sending the message in the clear, when it is determined that the secure message flag of the address book entry is not set.

11. The method of claim 8, wherein performing the security operation comprises determining if a default send flag has been set, when it is determined that the secure message flag of the address book entry is set.

12. The method of claim 8, further comprising:
   setting a default send flag.

13. The method of claim 8, wherein performing the security operation comprises sending the message using a digital certificate stored in association with the recipient, when it is determined that the secure message flag of the address book entry is set.

14. The method of claim 8, wherein performing the security operation comprises:

presenting options for sending the message; receiving an input selecting one of the options; and sending the message in accordance with the selected option.

15. The method of claim 9, further comprising:
receiving the digital certificate including the digital certificate information; storing the digital certificate information in the memory; and setting the secure message flag in the address book for the address book entry associated with the recipient.

16. The method of claim 11, further comprising:
sending the message in accordance with the default send flag, when it is determined that the default send flag has been set.

17. The method of claim 15, further comprising:
sending the message using the digital certificate information.

18. The method of claim 14, wherein one of the options comprises sending the message using the digital certificate.

19. A non-transitory computer readable medium having computer readable instructions stored thereon that when executed cause a processor of a wireless mobile communication device:
receive a digital certificate;
extract a set of contact information from the digital certificate associated with a sender of the digital certificate;
analyze, based on the set of contact information, a set of address book entries of an address book stored in a memory of the wireless mobile communication device, wherein each of the set of address book entries comprises contact information associated with a given entity;
determine whether received digital certificate information associated with the digital certificate is already stored in at least one of the set of an address book based on analyzing the set of address book entries; and
store, a wireless mobile communication device, the digital certificate information in the address book in association with an address book entry corresponding to the received digital certificate, and set a secure message flag within the address book entry corresponding to the received digital certificate, based on determination that the received digital certificate information is not already stored in association with the address book entry in the memory of the wireless mobile communication device, wherein the secure message flag indicates that a corresponding digital certificate is stored for a contact of the address book entry.

20. A non-transitory computer readable medium having computer readable instructions stored thereon that when executed cause a processor to:
obtain a message addressed to a recipient;
determine whether a secure message flag of an address book entry associated with the recipient is set, the secure message flag indicating whether digital certificate information associated with the recipient is stored in a memory of the a wireless mobile communication device, the address book entry stored in an address book in the memory of the wireless mobile communication device, to determine whether the digital certificate information associated with the recipient is stored in the memory of the wireless mobile communication device; and
perform a security operation prior to sending the message, based on determination that the secure message flag is set.

21. A wireless mobile communication device for flagging address book entries, the device comprising:
a processor configured to: receive a digital certificate;
extract, a set of contact information from the digital certificate associated with a sender of the digital certificate;
analyze, based on the set of contact information, a set of address book entries of an address book stored in a memory of the wireless mobile communication device, wherein each of the set of address book entries comprises contact information associated with a given entity;
determine whether digital certificate information received by the wireless mobile communication device is already stored in an address book comprising contact information in a memory of the wireless mobile communication device, and
store, by a wireless mobile communication device, the digital certificate information in the address book in association with an address book entry corresponding to the received digital certificate and set a secure message flag in the address book entry corresponding to the received digital certificate, based on determination that the received digital certificate information is not already stored in the memory of the wireless mobile communication device.

22. The wireless mobile communication device of claim 21, wherein the processor is further configured to set the secure message flag for the address book entry corresponding to the received digital certificate when the processor determines that both the received digital certificate information is already stored in association with the address book entry in the memory, and the secure message flag is not set.

23. The wireless mobile communication device of claim 21, wherein the processor is further configured to create the address book entry corresponding to the received digital certificate prior to storing of the digital certificate information in association with the address book entry.

24. The wireless mobile communication device of claim 21, wherein the processor is further configured to extract the digital certificate information from a digital certificate.

25. The wireless mobile communication device of claim 21, wherein the processor is further configured to set a default send flag, the default send flag indicating that messages addressed to a contact for the address book entry are to be sent in a default manner.

26. The wireless mobile communication device of claim 23, wherein the processor is further configured to use the digital certificate to send secure messages to a contact of the address book entry.

27. A wireless mobile communication device, comprising:
a processor configured to obtain a message addressed to a recipient, determine whether a secure message flag of an address book entry associated with the recipient is set, the secure message flag indicating whether digital certificate information associated with the recipient is stored in a memory of the wireless mobile communication device, the address book entry stored in an address book in memory of the wireless mobile communication device, to determine whether the digital certificate information associated with the recipient is stored in the memory of the wireless mobile communication device, and
perform a security operation prior to sending the message, based on determination that the secure message flag is set.

* * * * *